(12) United States Patent
Higgins et al.

(10) Patent No.: US 11,533,100 B2
(45) Date of Patent: Dec. 20, 2022

(54) WIRELESS INTERNET ACCESS SYSTEM AND METHOD OF USING THE SAME

(71) Applicant: Digital Path, Inc., Chico, CA (US)

(72) Inventors: James Higgins, Chico, CA (US); Brock Eastman, Chico, CA (US)

(73) Assignee: Digital Path, Inc., Chico, CA (US)

( * ) Notice: Subject to any disclaimer, the term of this patent is extended or adjusted under 35 U.S.C. 154(b) by 632 days.

(21) Appl. No.: 16/226,457

(22) Filed: Dec. 19, 2018

(65) Prior Publication Data

US 2019/0190588 A1 Jun. 20, 2019

Related U.S. Application Data

(60) Provisional application No. 62/607,871, filed on Dec. 19, 2017.

(51) Int. Cl.
| | |
|---|---|
| *H04W 48/16* | (2009.01) |
| *H04W 88/08* | (2009.01) |
| *H04B 7/155* | (2006.01) |
| *H04B 7/0413* | (2017.01) |
| *H04W 88/16* | (2009.01) |
| *H04B 7/0452* | (2017.01) |

(52) U.S. Cl.
CPC ....... *H04B 7/15507* (2013.01); *H04B 7/0413* (2013.01); *H04W 48/16* (2013.01); *H04B 7/0452* (2013.01); *H04W 88/08* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 10,193,236 B1 * | 1/2019 | Lee | H01Q 3/24 |
| 2007/0252692 A1 * | 11/2007 | Wallace | G01D 21/00 340/539.26 |
| 2009/0232026 A1 * | 9/2009 | Lu | H04W 40/12 370/254 |
| 2010/0097928 A1 * | 4/2010 | Ramakrishnan | H04L 41/0896 370/221 |
| 2014/0062823 A1 * | 3/2014 | Shor | H01Q 21/28 343/816 |
| 2017/0135022 A1 * | 5/2017 | Amini | H04L 43/16 |
| 2018/0316650 A1 * | 11/2018 | Forde | H04L 12/4633 |
| 2018/0332563 A1 * | 11/2018 | Sihlbom | H04W 48/10 |
| 2019/0028159 A1 * | 1/2019 | Bisiules | H01Q 25/005 |
| 2019/0109696 A1 * | 4/2019 | Safavi | H04B 7/0617 |

* cited by examiner

*Primary Examiner* — Robert M Morlan
(74) *Attorney, Agent, or Firm* — FisherBroyles, LLP; Rob L. Phillips

(57) ABSTRACT

System and method incorporating devices wirelessly connected to remote gateway locations or other devices. Remote gateway locations can be located on towers, buildings, silos, trees, utility poles, light poles or any other support structure capable of supporting the equipment used. A wired or wireless backhaul connects each remote gateway to a centralized headend gateway location via Ethernet, fiber, laser, or licensed or unlicensed microwave signals. Devices wirelessly connected to a remote gateway location device then act like a new remote gateway, redistributing signals to the surrounding area for additional CPEs to connect to that CPE. This continues over and over in a self-propagating manner, creating one or more network legs off the original remote gateway device.

56 Claims, 15 Drawing Sheets

WIRELESS INTERNET ACCESS SYSTEM AND METHOD OF USING THE SAME

CROSS-REFERENCE

This application claims priority to U.S. Patent Application No. 62/607,871 filed Dec. 19, 2017 and incorporated herein by reference for all purposes.

FIELD OF THE INVENTION

This application relates to a wireless internet access system incorporating devices wirelessly connected to remote gateway locations or other devices.

BACKGROUND

Conventional wireless internet access systems are capital intensive, difficult to scale, degrade with distance and provide little to no redundancy on the last hop from tower to customer. These systems are designed where every Customer Premise Equipment (CPE) antenna is precisely aligned to a specific tower and wirelessly associated to a specific antenna and/or radio on that tower. Tower coverage area is fixed based on: tower geographic location, surrounding terrain, vegetation, $1^{st}$ & $3^{rd}$ party interference, environmental factors, antenna design, antenna orientation and frequencies used. These towers may have some internet backhaul to a headend location via: Ethernet, fiber, laser and/or licensed or unlicensed microwave signals utilizing a wide array of frequencies from under 900 MHz to well over 80 GHz. Ideally, the towers are directly connected to fiber, but often this is not cost effective, especially in rural markets. In rural markets, some towers are interconnected via Point to Point (PTP) microwave links relaying bandwidth from tower to tower in a hub and spoke or network ring design back to a headend location. Adding coverage and capacity to these conventional systems is time consuming and capital intensive.

Additional coverage requires tower and ground space to be leased at an existing tower facility, if one happens to be located where coverage is desired, or a new tower must be constructed at considerable expense.

Adding backhaul capacity usually requires upgrading existing equipment. If the tower needing additional bandwidth is not directly connected to fiber and instead is connected to another tower via PTP microwave, multiple PTP microwaves may need to be upgraded to upgrade bandwidth at the desired tower. This can multiply backhaul upgrade costs by increasing the number of PTP links needing to be upgraded.

Additional Point to Multipoint (PTMP) capacity requires additional access points be added to a tower if the tower can support the additional access point loading. This can require lease negotiation, monthly rent increases and new antennas to be installed. There are also instances where a tower cannot physically support additional access point loading or there is insufficient spectrum available to support the additional access point or access points.

Constructing a new tower in an existing area to increase capacity and/or coverage requires significant capital investments to permit and construct the new tower facilities. Once the tower is installed, existing CPE's must be physically repointed to the new tower to optimize network performance. Re-optimizing the network in this manner is a slow and capital-intensive process.

In conventional wireless internet access systems, when a tower access point goes offline for any reason, CPE's dependent on, or wirelessly connected to, the offline access point remains offline until there is some sort of user intervention, either remotely or physically on site to repair the access point. Extended outages such as this scenario can degrade the customer experience.

Thus, it would be advantageous to develop a wireless internet access system having improved network speeds, network scalability, resiliency, flexibility, reliability, connection quality and improves coverage (particularly in heavy foliage areas). Beneficially, the wireless internet access system enhancement should also reduce capital expenditures associated with: new buildouts, adding coverage and upgrading backhaul capacity.

SUMMARY

In one embodiment, the wireless internet access system described herein incorporates devices wirelessly connected to remote gateway locations or other devices. Remote gateway locations can be located on towers, buildings, silos, trees, utility poles, light poles or any other support structure capable of supporting the equipment used. Some form of wired or wireless backhaul connects each remote gateway to a centralized headend gateway location via Ethernet, fiber, laser and/or licensed or unlicensed microwave signals. Devices wirelessly connected to a remote gateway location device then act like a new remote gateway redistributing the signal to the surrounding area for additional CPEs to connect to that CPE. This continues over and over in a self-propagating manner, creating one or more network legs off the original remote gateway device.

Depending on the embodiment, the wireless internet access system may incorporate one or more network topologies or combinations thereof including but not limited to: point to point, hub and spoke (star), ring, and tree architectures.

Other variations, embodiments and features of the present invention will become evident from the following detailed description, drawings and claims.

DETAILED DESCRIPTION

Figure 1:
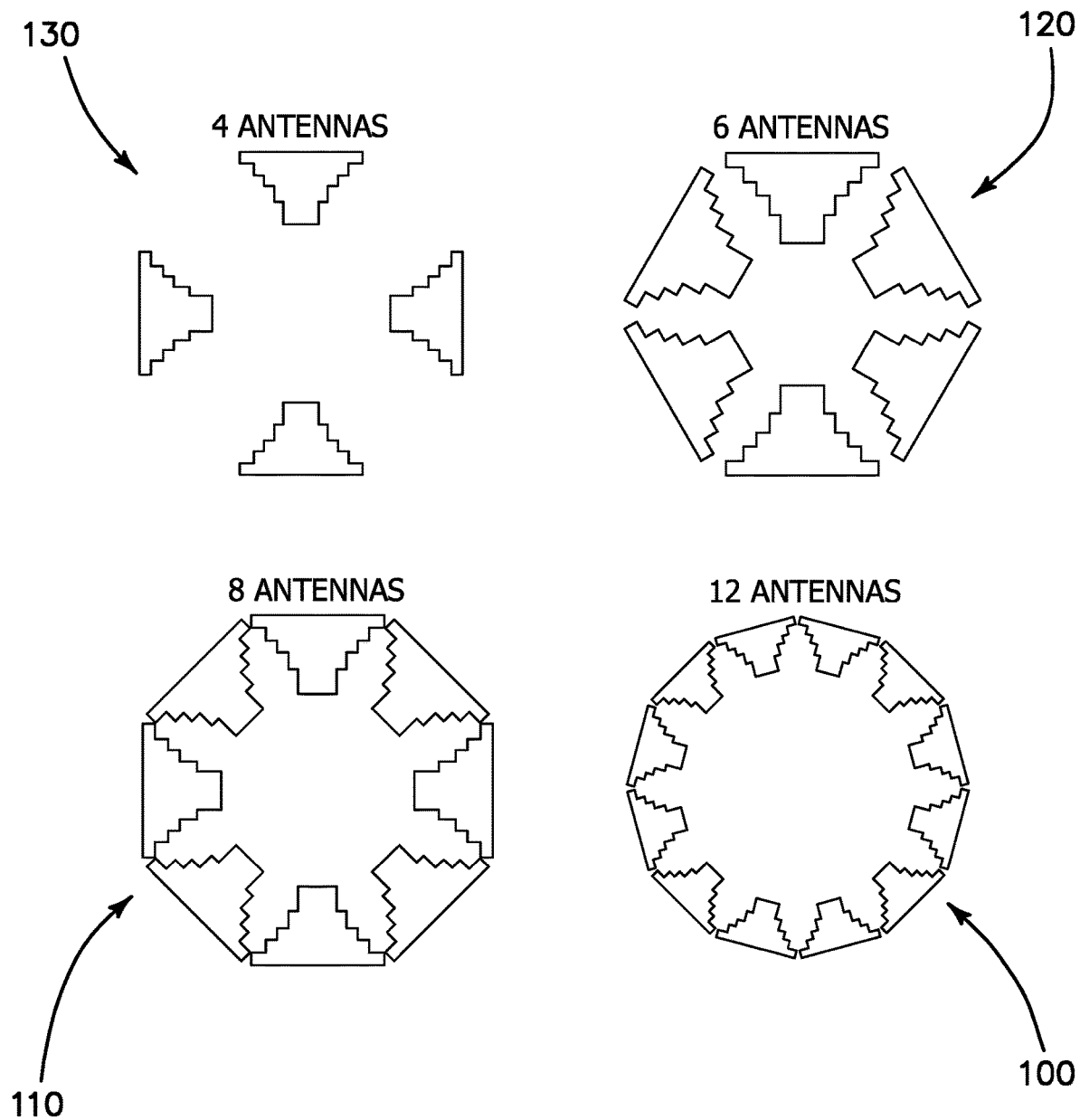
FIG. 1 illustrates various directional antenna configurations.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Applicant herein incorporates by reference for all purposes U.S. Pat. No. 6,831,921, entitled "Wireless Internet Access System" and U.S. Pat. No. 9,838,065 entitled "Methods and Systems for High Capacity Wireless Broadband Delivery."

Those skilled in the art will recognize that the embodiments of the present invention involve both hardware and software elements which portions are described below in such detail required to construct and operate a wireless internet access system according to the embodiments of the present invention.

In one embodiment, as shown in FIG. 1, devices in the wireless internet access system described herein may comprise one or more directional antennas. Antennas may be of various size and beam width to accomplish various purposes. More, narrower antennas may be desirable in areas where noise immunity or greater capacity is required because more focused antennas provide higher gain, tighter coverage, and transmit and receive less interference. Alternatively, fewer, wider antennas may be desirable in areas where interference and capacity are not an issue.

Some examples of antenna configurations, as shown in FIG. 1, include, but are not limited to: twelve 30° antennas 100, eight 45° antennas 110, six 60° antennas 120, four 90° antennas 130, two 180° antennas or one 360° antenna. Antenna polarization can be vertical, horizontal, positive, negative 45° slant or circular. As an option, a device may also be configured to provide less than 360° of coverage using one or more antennas. To increase redundancy and improve performance, individual antennas may be oriented in such a way that their radiation patterns overlap. Such a configuration allows an uplink antenna to perform solely as an uplink while other antennas overlapping the same coverage connect to other devices eliminating dead spots, improving redundancy (if a radio was to fail) and/or preventing a 50% performance reduction on the uplink antenna if another device connected to it.

Figure 2A:
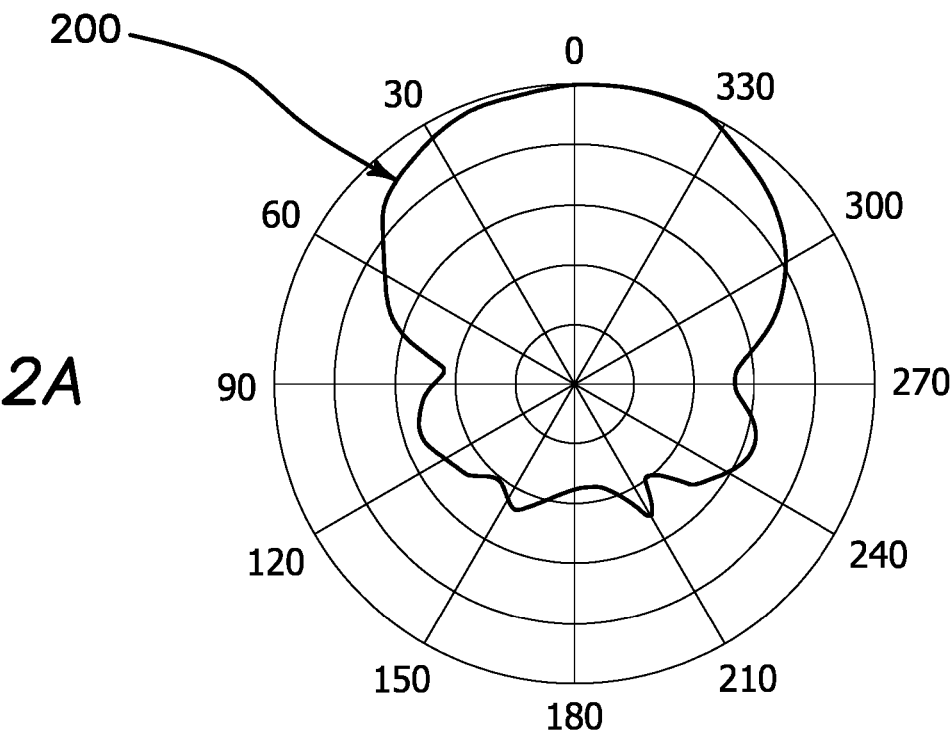
FIG. 2A illustrates the radiation pattern of a traditional element array sector antenna.
Figure 2B:
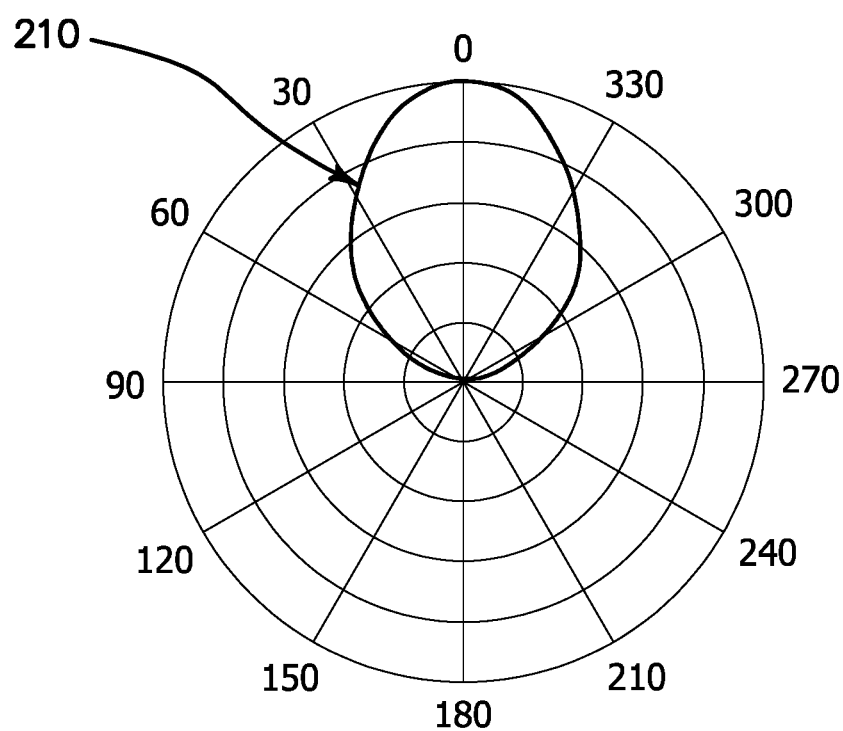
FIG. 2B illustrates the radiation pattern of a horn antenna.

Symmetrical or asymmetrical horn antennas may also be desirable due to their ability to reject interference outside their intended antenna radiation pattern as well as reduce adjacent channel and co-channel interference by reducing antenna radiation pattern overlaps. As shown in FIG. 2A, traditional sector antennas with stacked element arrays typically have side lobes that extend outside the antennas intended radiation pattern or even directly behind the intended radiation pattern 200. This means traditional antennas transmit and receive Radio Frequency (RF) signals into areas not intended or desired which can cause unwanted interference. As shown in FIG. 2B, symmetrical horn antennas do not have side lobes transmitting RF signals outside intended coverage area 210. Symmetrical horn antennas also have symmetrical radiation patterns between antenna chain polarizations minimizing signal chain mismatches near the edges of an antenna's coverage area. Symmetrical horn antennas also have excellent front to back ratios. This allows antennas which are offset a certain degree from each other (such as 180°) to utilize the same frequency without causing self-interference. As another antenna option, phased antenna arrays may replace or be integrated into horn antennas in devices to utilize beamforming or beam steering capabilities.

In another embodiment, multiple horn antennas are oriented to provide 360° of coverage like a traditional omni directional antenna without the inherent omni dead spots, chain mismatches, lower gain and increased interference. Accordingly, instead of one sector or omni antenna with 2 chains covering up to 360° from a centralized tower or picocell location feeding CPEs, each CPE in the wireless internet access system can provide up to 360° coverage via horn antennas or some other form of antennas oriented on various azimuths based on the antenna beam widths. Tighter antenna radiation patterns drastically improve noise immunity compared to omni antennas that listen in 360°

In another embodiment, additional receive chains and/or antennas are utilized to increase receive signal on a device. By adding additional receive only chains, the receive gain may be increased from 6 dBi to 9 dBi. This is particularly useful with 4×4, 8×8 or higher multi-input and multi-output (MIMO) radios providing the ability to increase link budgets without exceeding regulatory body transmit power or transmit antenna gain limitations.

In another embodiment, a device enclosure is rated with an Ingress Protection Marking (or IP rating). Gore vents or some other form of waterproof membrane may also be installed on the device enclosure to prevent pressure and condensation buildup inside the waterproof enclosure.

Figure 3A:
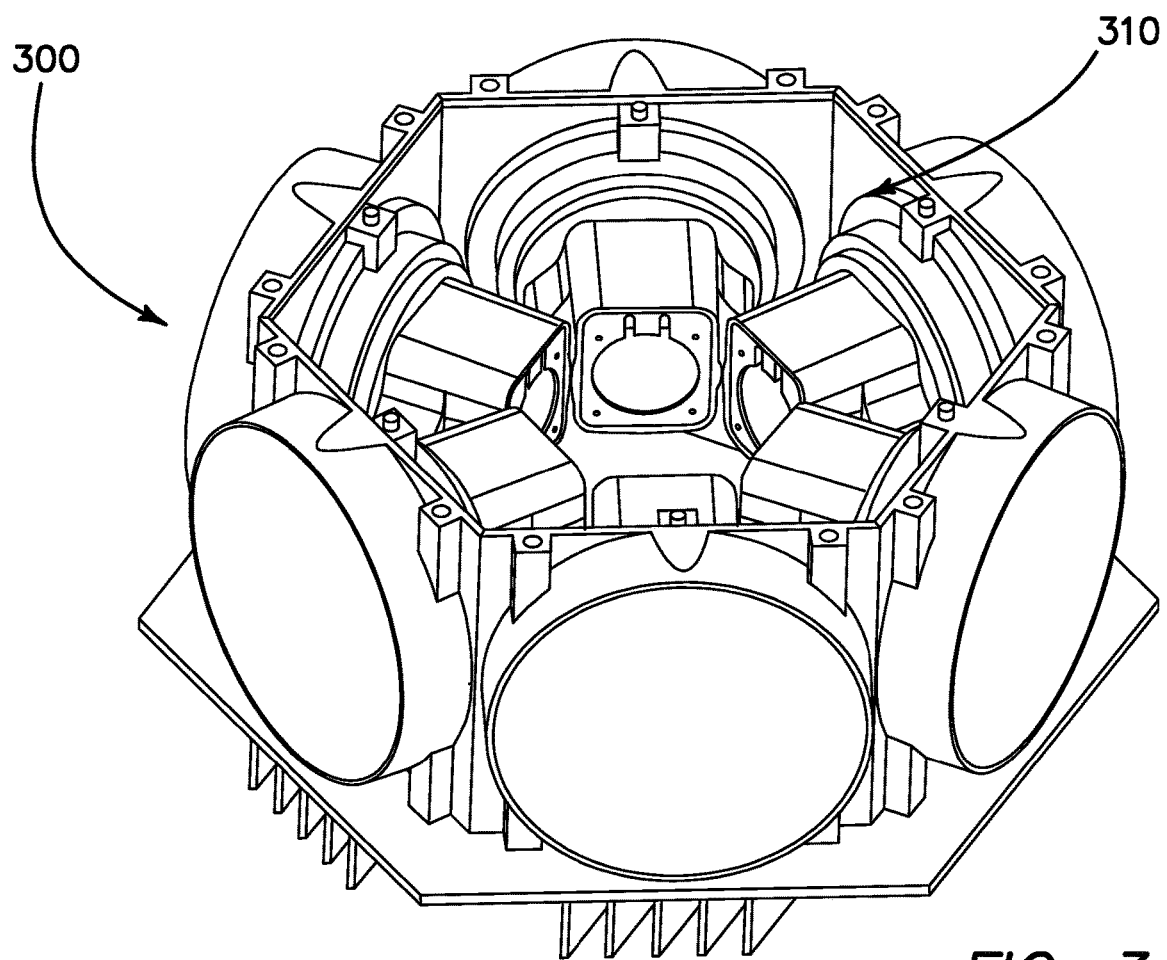
FIG. 3A illustrates a multiple antenna device enclosure.
Figure 3B:
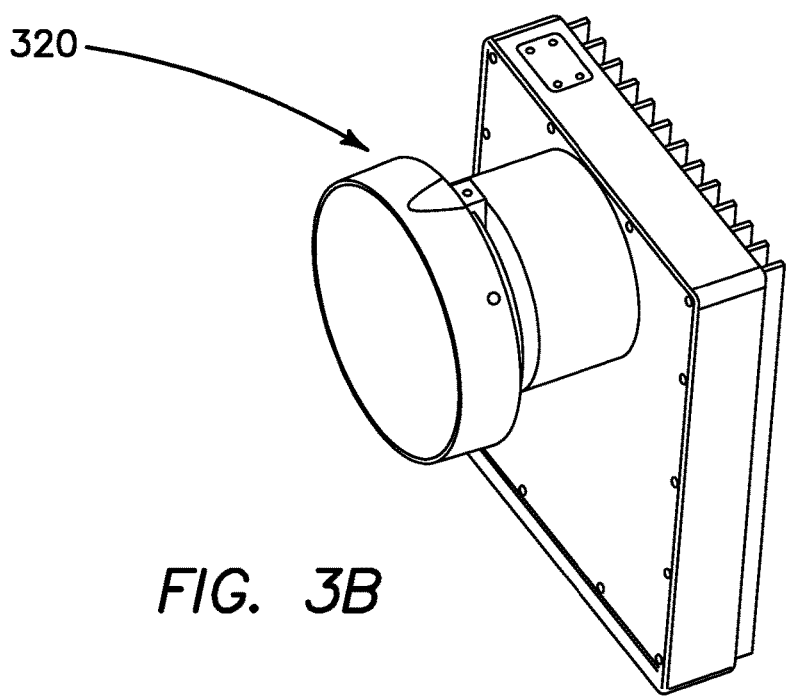
FIG. 3B illustrates a single antenna device enclosure.

In another embodiment, device enclosures may also be designed to shield RF energy from entering or exiting the device enclosure except through the antennas. This may be accomplished by enclosing the circuit board and radios in a metal or RF attenuating enclosure 320 as shown in FIG. 3B. FIG. 3A shows a six-antenna array metal or RF attenuating enclosure 300 with a top plate 310 (shown as transparent) and plastic housing 400 (shown in FIG. 4B) to allow the interior arrangement to be viewed. Connections between antennas and radios may also utilize shielded coaxial cables to prevent RF from bleeding out of the cables and into undesired areas. Cables connecting radios to antennas may also be routed through metal channels cut into the device enclosure to further isolate the cables from one another and other RF sensitive components. Direct solder, U.FL, BNC, SMA, RPSMA or N connectors may be used to make connections between radios, cables and antennas. As an option, higher or lower gain external antennas may be used as well via connectors and cables. Such system features reduce interference, improve noise floors and allow higher performance.

Figure 4A:
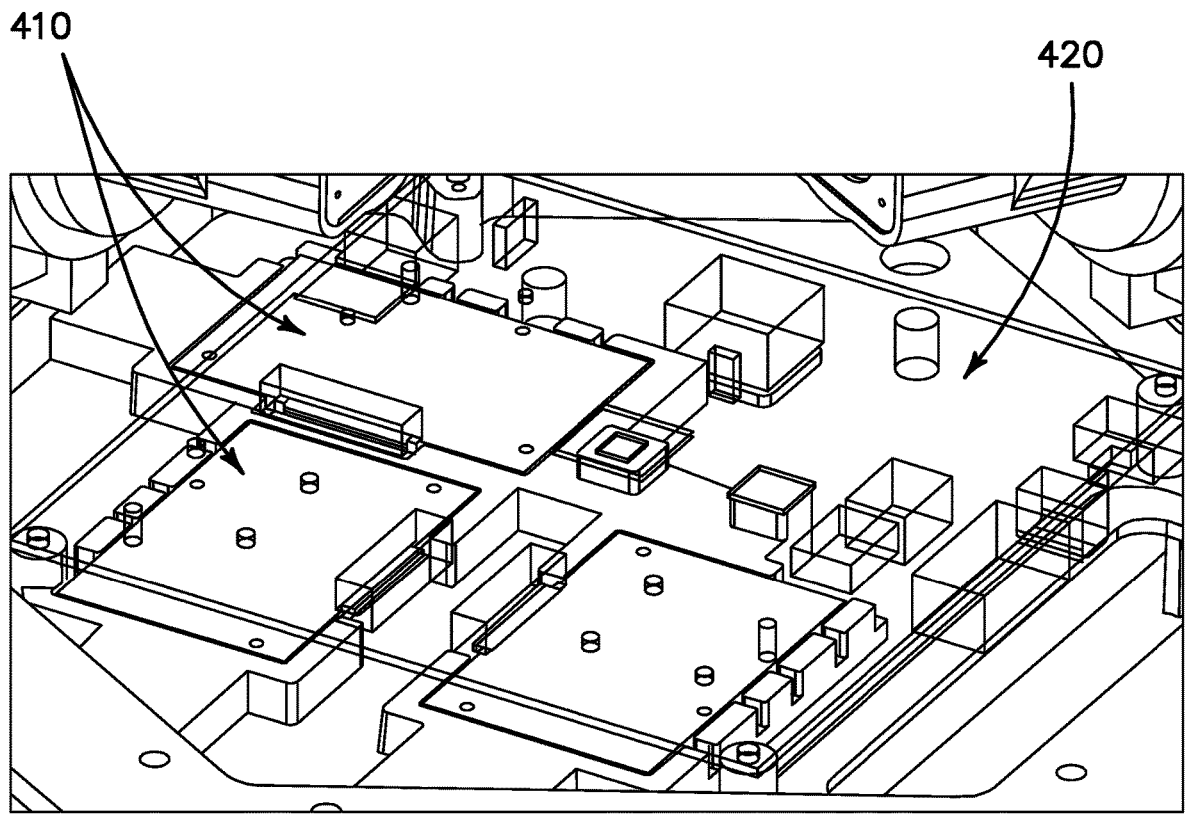
FIG. 4A illustrates three radios recessed in a metal housing forming part of a device enclosure.
Figure 4B:
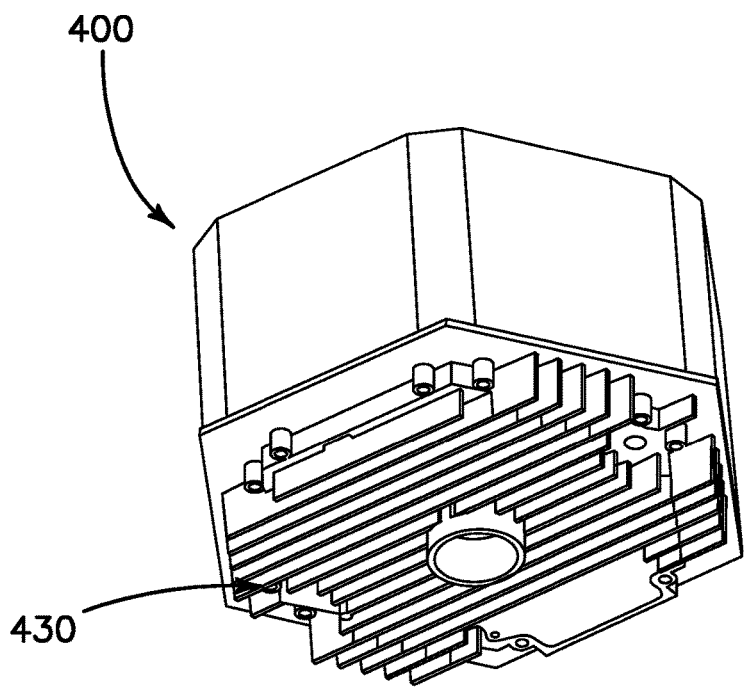
FIG. 4B illustrates the metal housing about the three radios.

Additionally, individual radios 410 attached to a circuit board 420 within an enclosure 300 or 320 may also be shielded in such a way to prevent cross talk from radio to radio as shown in FIGS. 4A and 4B. As shown, the circuit board 420 is translucent for display purposes only. Radios may be recessed into a metal enclosure and oriented in such a way to provide additional RF shielding utilizing the enclosure 300 or 320 itself as a shield. Additionally, this design may aid in heat dissipation from heat generating components via use of bosses protruding from the enclosure 300 or 320 and coming in direct contact with the heat generating components. The bosses allow maximum heat transfer away from the components and into the enclosure 300 or 320. The enclosure 300 or 320 may have heat sinks 430 built into the outside of the enclosure 300 or 320 to increase convection heat transfer to air. By using horn antennas, shielding radios, and shielding cables, the embodiments of the present invention allow multiple radios to transmit and receive independently on closely adjacent channels without the need for large guard bands or additional filters improving performance and channel reusability while reducing cost.

In another embodiment, devices of the wireless internet access system may utilize radios that are capable of transmitting and receiving wireless signals on licensed, lightly licensed and/or unlicensed radio frequency bands. A few examples of unlicensed bands include ISM or UNII-1, UNII-2, UNII-3 and CBRS bands. These unique frequency bands may have different EIRP, antenna gain, transmit power and various other requirements and/or restrictions (through various regulatory bodies such as the FCC). The embodiments of the present invention are configurable to work within any of the frequency bands.

In another embodiment, devices of the wireless internet access system comprise one or more N×N radios where N×N can be 2×2, 4×4, 8×8, 16×16 or greater MIMO capable radios. A radio may be defined as a transmitter, receiver, both transmitter and receiver, or a transceiver. These radios may utilize 802.11AC MU-MIMO, 802.11AX or better standards. Other industry accepted standards such as 802.11N, 802.11G or 802.11B may also be used for backwards compatibility with legacy devices but wireless performance may be sacrificed. Radios may have the ability to raise or lower modulation rates based on various factors. Some examples of usable modulation rates are BPSK, QPSK, 8QAM, 16QAM, 32QAM, 64QAM, 128QAM, 256QAM, 512QAM, 1024QAM, 2048QAM, 4096QAM or higher. Radios may operate in FDD, TDMA, FDMA, TDD modes and may be capable of half-duplex or full-duplex transmissions on one or more channels simultaneously. Radios operating in half-duplex mode may have the ability to adjust radio transmit and receive duty cycles independently to accommodate for example, more customer download data than upload data. This duty cycle adjustment may be made on an individual, network leg or network wide basis. Radios may also be configured to utilize Clear Channel Assessment (CCA). CCA is a mechanism for determining if a channel is in use or idle so as to control shared channel access and prevent packet collisions. CCA may be utilized in the wireless internet access system to allow for the same or closely adjacent channels to be used on multiple devices in an area without having to worry about interference. As another option, CCA may be disabled if GPS timing is used for transmitting synchronization or for PTP wireless links to ensure they are not forced to wait before transmitting, providing maximum throughput.

In another embodiment, radios are configured to receive a signal at a given frequency, then down convert that signal to a lower frequency, filter out undesired frequency ranges, then up convert the signal back to the original frequency. This may improve performance significantly, particularly in areas with a lot of interference. This may be possible to filter on a per channel and/or per chain basis. Radios may also have software filters to provide additional filtering if necessary. Further, software defined radios may be utilized in the wireless internet access system for configuration and flexibility.

In another embodiment, devices may have one or more spare radios that are configured to listen constantly through different antennas on different azimuths to detect interference, other traffic or radar. This may be particularly useful when radios are operating in frequency bands that require radios to be aware of certain grandfathered systems that must be avoided if detected. An example is when frequency bands require the use of Dynamic Frequency Selection (DFS). With the embodiments of the present invention, devices may already know what channels a device may and may not be allowed to use to circumvent the DFS listening delay typically associated with use of these channels.

Figure 5:
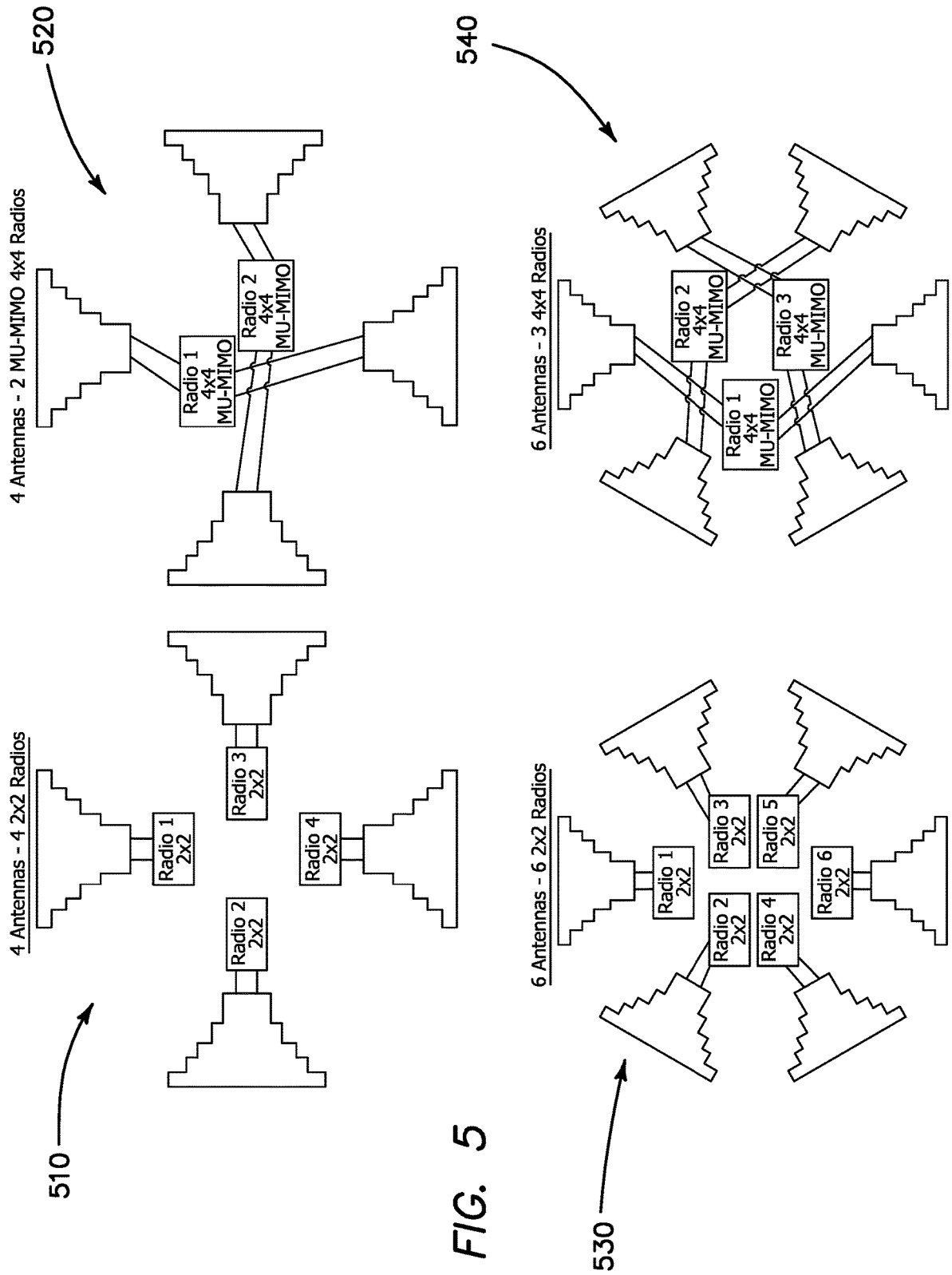
FIG. 5 illustrates various MU-MIMO radio to antenna and non-MU-MIMO radio to antenna wiring configurations.

In another embodiment, radios with MU-MIMO capabilities can be utilized with or without their MU-MIMO feature enabled. If radios are used that are not MU-MIMO capable or MU-MIMO capable radios have their MU-MIMO capabilities disabled, then additional radios may be added to achieve similar coverage and performance as shown in FIG. 5. FIG. 5 shows MU-MIMO radio to antenna and non-MU-MIMO radio to antenna wiring configurations including four antennas utilizing either four 2×2 radios 510 or two MU-MIMO 4×4 radios 520. As another option, FIG. 5 also shows six antennas, utilizing either six 2×2 radios 530 or three 4×4 radios 540. MU-MIMO capabilities allow a radio to wirelessly transmit and receive on two or more antennas to multiple devices simultaneously on the same frequency if antenna azimuth offset and antenna front to back ratios are great enough. This allows for much more efficient use of spectrum. This can be accomplished utilizing horn antennas in very close proximity to one another without the need for cavity filters or radio timing coordination. In some instances, particularly in high interference areas, more radios and/or system timing may be desirable because more radios can provide greater channel flexibility. In some situations, it may be desirable to utilize one 4×4 radio as two 2×2 radios, transmitting and receiving on up to two different channels simultaneously. In another example, one 8×8 radio can act like four 2×2 radios, transmitting and receiving on up to four different channels simultaneously.

In another embodiment, devices in the wireless internet access system have individual chains of a radio connected to different antennas. For example, a device may comprise one 4×4 radio and four 90° antennas, wherein the four individual radio chains are connected to the four different 90° antennas. As another example, a device may comprise one 6×6 radio and six 60° antennas, wherein the six individual radio chains are connected to the six different 60° antennas. As another example, a device may comprise one 8×8 radio and eight 45° antennas, wherein the eight individual radio chains are connected to the eight different 45° antennas. Each of the said connected antennas may be polarized any way desired. For example, antennas may alternate between vertical and horizontal or circular polarized antennas, or all antennas may utilize the same polarization.

In another embodiment, devices in the wireless internet access system may utilize one or more radios with one or more MIMO antennas. For example, a device may comprise one 8×8 radio and four 90° MIMO antennas, wherein the eight individual radio chains are connected to the four different 90-degree MIMO antennas using two chains per antenna. As another example, a device may comprise one 6×6 radio and three 120° MIMO antennas, wherein the six individual radio chains are connected to the three different 120° MIMO antennas using two chains per antenna. As another example, a device may comprise one 4×4 radio and two 180° MIMO antennas, wherein the four individual radio chains are connected to the two different 180° MIMO antennas using two chains per antenna. Each antenna may have one chain connected to a vertically polarized antenna port and the other chain connected to a horizontally polarized antenna port. Or each antenna can have one radio chain connected to a positive slant 45° antenna port and the other chain connected to a negative slant 45° antenna port.

In another embodiment, devices in the wireless internet access system comprise one or more circuit boards with many types of chips, amplifiers, connection points, ports, and other common parts and pieces well known to those skilled in the art. Devices may accept power via POE (through various industry accepted standards such as 802.3AF or 802.3AT), direct DC power or possibly inductive power. AC power may be supplied from a customer home, customer business, a headend gateway, a remote gateway, or a solar and/or wind turbine system. If AC power is used, the AC power passes through an AC to DC transformer converting the AC voltage into DC voltage that is sent to the device through a power injector or directly connected to the device. Both power and bi-directional data may be provided to a device through a single cable or power may be provided through one cable and bi-directional data may be provided through one or more additional cables. Circuit board input voltage may range from −48V to +56V DC. The circuit board may be configured with various kinds of data ports such as ethernet, coaxial, fiber, USB, serial or other industry accepted port types. These data ports may allow for a data connection to be established between a device on a customer's roof and a customer's router, switch, access point or computer inside their home. Or, as another option, a power and/or data connection may also be made between a device and another device or a network hardware component such as a switch or router. Devices may have an extra USB 3.0 or greater port and/or one or more extra ethernet ports with the option for power and data to be output to allow for various types of future additions such as 4G or 5G radios, 60 GHz backhaul, 900 MHz PTMP, hotspot services or any other supported need. Devices may add on additional devices to provide additional services such as cellular, UHF and VHF repeaters, internet of things, Scada or any other future use In another embodiment, devices are built with intelligence such as a hardware watchdog that is capable of power cycling devices in the event a process fails and the device stops responding or a device is no longer able to ping another device or piece of network hardware. A device may be installed with a surge protection system to reduce or prevent voltage transients from damaging network equipment and/or customer premise equipment. A device may also be configured with a battery backup system allowing the device to operate after a power outage occurs for a period of time. Battery run time may be extendable with the addition of one or more batteries. The hardware watchdog system and the battery backup system may be incorporated into a single system capable of both functions or be two separate systems.

In another embodiment, devices of the wireless internet access system may be equipped with a Global Positioning System (GPS) receiver. The GPS receiver may be configured to determine location data such as latitude, longitude and altitude. The GPS receiver may also have the capability to receive Pulse Per Second (PPS) information from orbiting satellites that may be used to synchronize radio transmission and reception within the system. This may allow all radios to operate in half-duplex mode, transmitting simultaneously and then receiving simultaneously. This can prevent device to device interference that can occur if transmissions are not synchronized via GPS PPS. As another option, a single GPS antenna may be installed at a headend gateway, remote gateway, secured location or customer premises and provide PPS timing coordination for all devices at the location. Additionally, a compass chip may be added to devices to determine precise device azimuth orientation.

In another embodiment, devices of the wireless internet access system may utilize high performance radios. High-performance radios can produce large amounts of heat, especially as output power and/or duty cycle increases. These radios are typically designed to reduce performance when certain temperature thresholds are exceeded as a measure to prevent or reduce component failure. Devices may incorporate a thermal transference heat sink system to remove heat from temperature sensitive components and the circuit board(s). Examples of components that may benefit from heat removal include but are not limited to: power amplifiers, microprocessors, microcontrollers, flyback switchers (transformers), main CPU and the ethernet physical layer transceiver (PHY). This heat sink system may increase radio performance and extend component life by allowing devices to operate at cooler temperatures. The heat sink system may have fins that protrude from the outside of the device enclosure on various faces and in various directions to increase the enclosures surface area thus increasing heat transfer to air through convection. Heat generated by the radios and other high temperature components may be transferred to the device enclosure via the use of bosses. These bosses may be built into the device enclosure and be in direct contact with heat generating components on the radio(s) and circuit board(s). This allows heat to be transferred away from heat generating components and into the device enclosure. This heat transfer design may utilize copper, aluminum, thermal foam, thermal paste, heat pipes, fans or any other industry accepted heat transfer solution. See FIGS. 4A and 4B.

In another embodiment, the wireless internet access system incorporates headend gateway locations. The headend gateways may be located in data centers, carrier hotels or any other facility such as an office building. Headend gateways typically consist of one or more servers, routers and/or switches used for various purposes such as traffic routing, user authentication, traffic shaping, traffic accounting and network monitoring. Headend gateways typically have gigabit or multi-gigabit internet connectivity through one or more fiber carriers such as Zayo, Cogent, Level 3 or any other bandwidth provider. Headend gateways can serve as traffic aggregation points in this network design, with one or more wireless or wired connections to remote gateway(s). Headend gateways may be utilized to attach devices to serve customers directly from the headend gateway.

Figure 6:
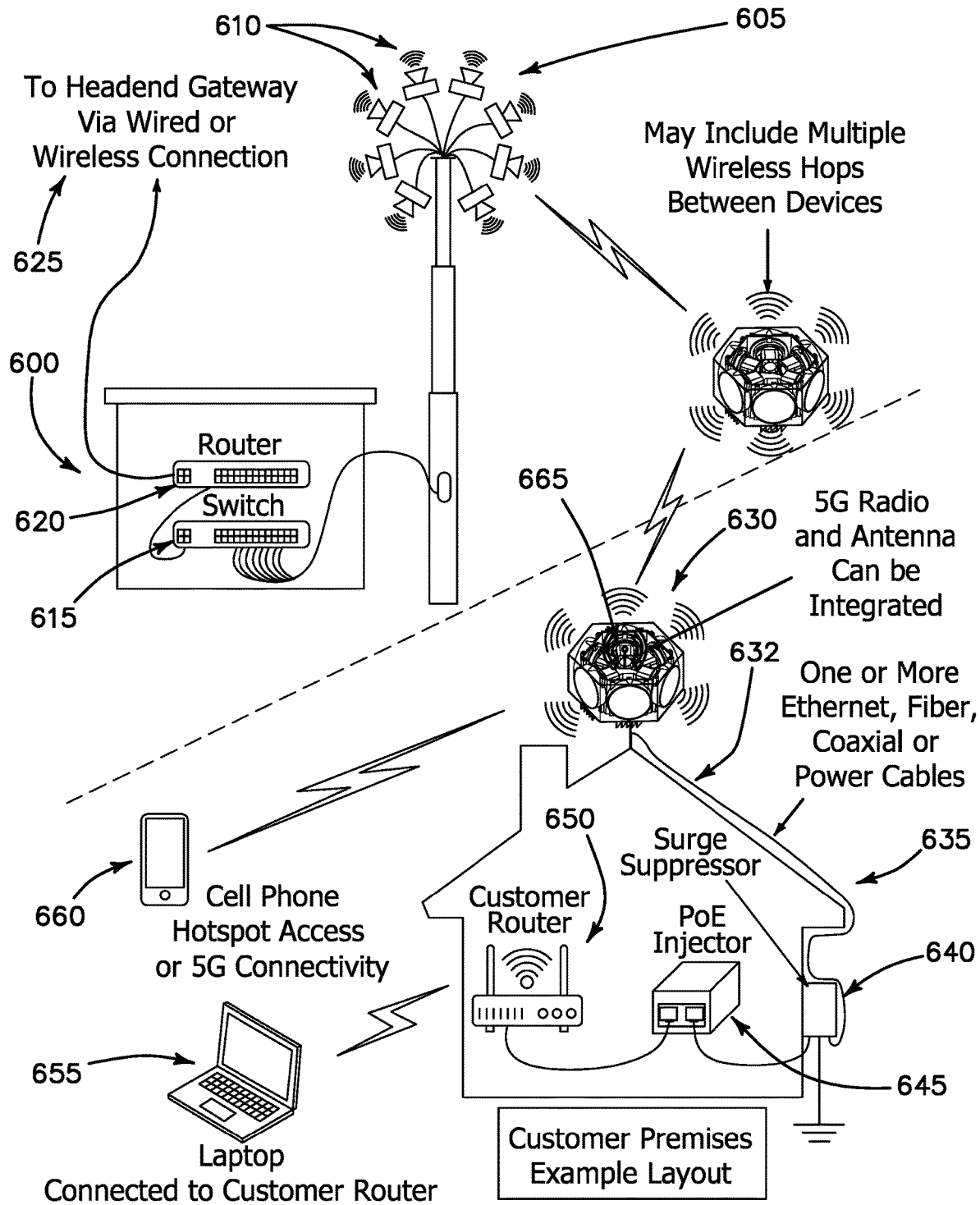
FIG. 6 illustrates a remote gateway and customer premise according to the embodiments of the present invention.

FIG. 6 shows an example of a remote gateway and customer premises. The remote gateway 600 includes an antenna structure 605 with multiple single antenna devices 610 attached thereto. As another option, the remote gateway 600 may have one or more multiple antenna devices 610 or 710 attached to the antenna structure 605. Each device has a wired connection to a switch 615 for power and/or data. The switch 615 is connected to a router 620 and the router 620 is connected to a wired or wireless backhaul to a headend gateway 625. One of the devices 610 on the antenna structure 605 is shown transmitting a wireless signal to a customer device 630 at a customer premise 635. It is important to note that the wireless connection shown between the remote gateway 600 and the customer device 630 may include more than one device-to-device wireless connection to reach the destination customer device 630. The customer device 630 is shown attached to a customer's building 635 or roof with some form of antenna mount. One or more wires 632 run from the customer device 630 to a surge suppressor 640 connected to a grounding point outside the customer's building 635 and then runs to a power source 645 inside the customer's home 635. This example shows a PoE injector as the power source 645 but other power sources are conceivable. The LAN side of the power injector 645 is then connected to a customer's wireless router 650 and a laptop 655 is shown as wirelessly connected to the router 650. The customer premise device 630 also shows two options for a wireless connection to another device such as a cell phone 660. One option is using the wireless radios in the customer device 635 to allow hot spot connectivity to the phone 660. The other option shown is to utilize a built in or externally connected 5G radio and antenna to 665 wirelessly connect the phone to provide 5G data and/or voice services though this network to supplement a cellular carrier's network infrastructure.

In another embodiment, the wireless internet access system incorporates physical remote gateway locations. Remote gateway locations may be located in a centralized location within a town or city and serve as a main distribution point within the surrounding area. In another option, multiple remote gateways may be distributed around a town or city to provide additional bandwidth, redundancy and avoid wireless interference. As an additional option, remote gateways may be located in rural areas outside of towns or cities based on customer demand and network design requirements. Remote gateways may be secured by lease agreement along with a form of payment, discounted or free service or services. Remote gateway location selection is integral to network performance. Remote gateway structures can be towers, utility poles, light poles, buildings, silos, customer homes, trees or any other mounting structure capable of supporting the equipment used. As an option, remote gateways may also be used as an office for remote employees to provide customer service, technical support to customers in the area as well as hardware storage for installers. Remote gateway locations may receive internet bandwidth through a wireless or cabled connection. Unlicensed or lightly licensed wireless frequencies most commonly used today include: UHF/VHF (White Space), 900 MHz, 2.4 GHz, 3.65 GHz, 5 GHz, 24 GHz and 60 GHz. Licensed wireless frequencies most commonly used today include: 6 GHz, 7 GHz, 11 GHz, 13 GHz, 18 GHz, 23 GHz and 80 GHz. Optical wireless technologies such as lasers may also be used. Cabled technologies such as fiber, ethernet, coaxial cable or DSL may also be used.

In another embodiment, some remote gateways may have a wired or wireless PTP connection back to a centralized headend gateway location in a hub and spoke arrangement. As another option, remote gateways may have a wireless or wired connection to another remote gateway. Remote gateways may be configured in such a way that every remote gateway communicates with every other remote gateway in a PTMP manner. As another option, a single remote gateway location can have multiple sources of bandwidth. These sources can be bonded together in a Link Aggregation Group (LAG), split to different devices or in a 1+X hot standby configuration. In addition to receiving bandwidth, remote gateways may redistribute bandwidth to other remote gateways in an area via wireless or cabled PTP or PTMP connections.

In addition to remote gateways, secured locations may be utilized with the wired internet access system for device attachment and network redistribution. Secured locations may be customer premises located in an ideal area to rebroadcast the network. These locations may be secured by lease agreement along with a form of payment, discounted or free services to ensure device reliability.

In another embodiment, headend gateways, Remote Gateways and Secured Locations may have one or more devices mounted to a structure to rebroadcast bandwidth wirelessly to customer devices in an area. A headend gateway, remote gateway or secured location with a single device may utilize a device with one or more internal or external antennas oriented in such a way to provide some form of sectored coverage up to 360°. As an option, a second device can be added with an azimuth offset designed to minimize any signal loss when a connecting device is located between the center line azimuths (3 db & 6 db points) of two antennas. As another option, headend gateways, remote gateways or secured locations may incorporate multiple devices attached to a structure with each device oriented in such a way to wirelessly cover a specific azimuth range while the total coverage remains up to 360°. To increase redundancy in this configuration, antenna coverage may be overlapped, such that if a device fails, connected devices can re-associate to another remote gateway device and remain online.

Figure 7:
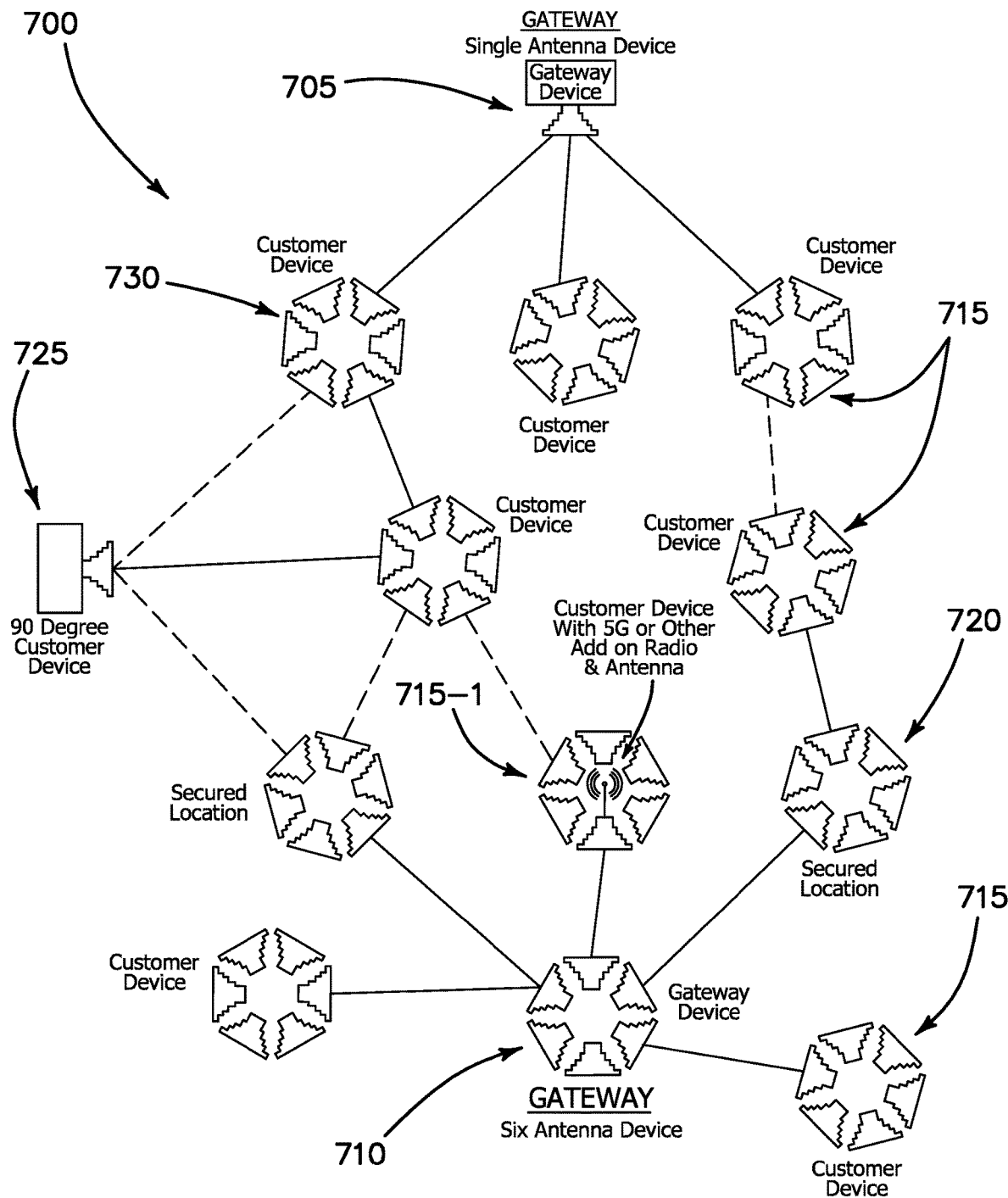
FIG. 7 illustrates a network of devices wirelessly connected through a wireless distribution system (WDS) in a network according to the embodiments of the present invention.
Figure 8:
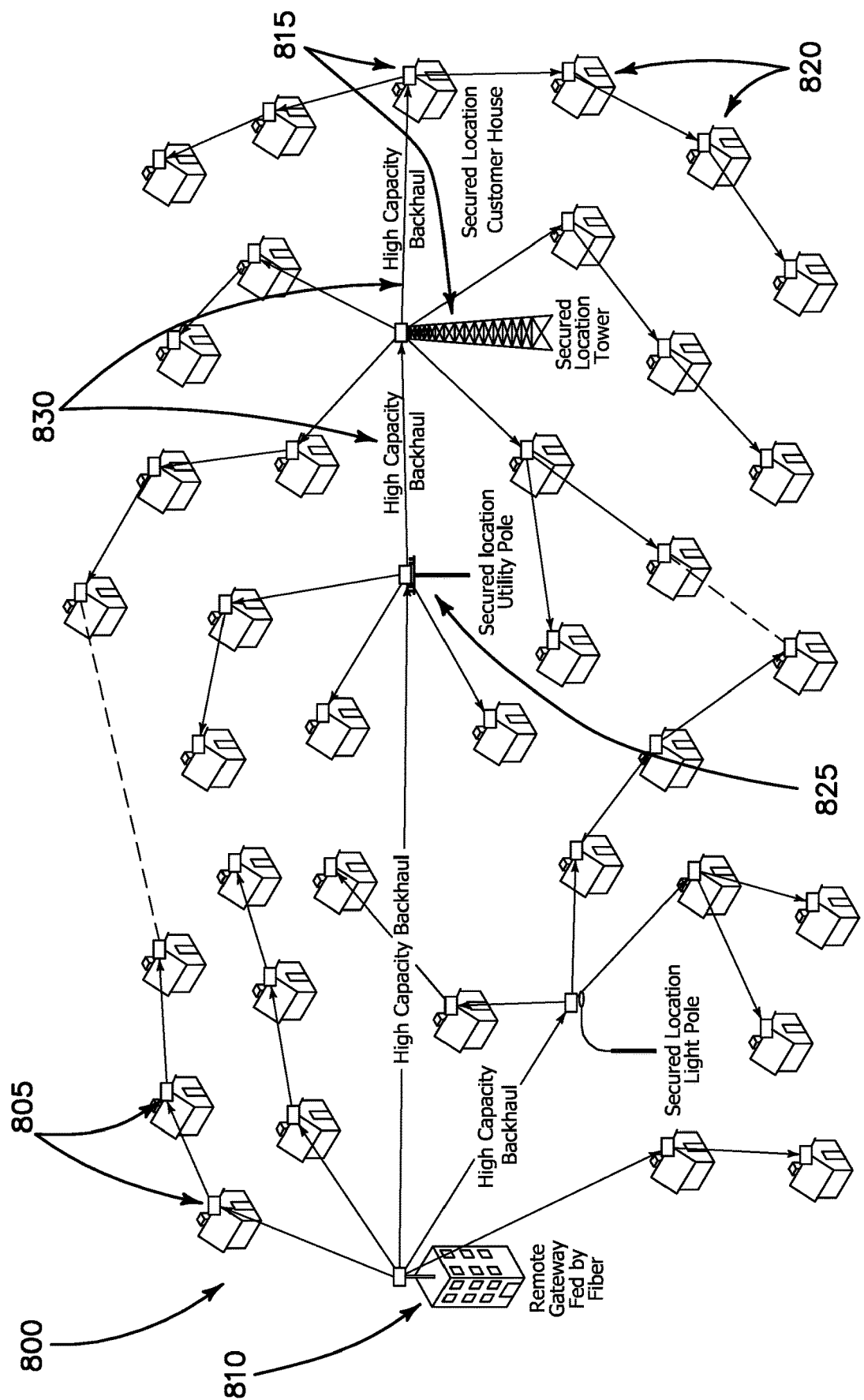
FIG. 8 illustrates a network architecture including devices affixed to a remote gateway location wirelessly redistributing signals to connected devices at secured locations and customer homes or businesses in the area according to the embodiments of the present invention.

In another embodiment, as shown in FIG. 7, the wireless internet access system incorporates a dynamic hub and spoke or star topology network architecture. Every device and radio can act as a CPE (child) and access point (parent) simultaneously. Devices receive signals either through a cable or wirelessly from a parent device, may provide internet to a customer and relay multi-Megabit or Gigabit throughput to a wirelessly connected child or children devices downstream. The network design includes one or more remote gateways and secured location devices in a geographic area such as a town, community or city. Customer devices in close proximity to a remote gateway or secured location device can directly associate to that device at good signal levels and high data rates. Customer devices farther away from a remote gateway or secured location device can connect to other customer devices already associated with the network upstream. Every device is essentially another location from which to rebroadcast for other devices to connect to as shown in FIG. 8. This network design of attaching licensed and unlicensed fixed wireless antennas to customer homes and configuring said antennas in such a way to also relay services to other customer's homes has been validated by the FCC in the USA through the issuance of the FCC's Over-the-Air Reception Devices (OTARD) rules. These rules exempt devices affixed to customer locations from permitting requirements and may even overrule home owner associations and landlord limitations on antenna attachments. This can allow a network to be built quickly without the majority of permitting fees and red tape associated with conventional network builds. Remote gateway locations may still be subject to permitting through a local governing agency if internet service is not directly provided to a customer at the remote gateway location.

FIG. 7 shows an example of devices wirelessly connected through a wireless distribution system (WDS) in a network 700. A single antenna remote gateway device 705 and a six-antenna remote gateway device 710 are shown wirelessly connected to customer device antennas 715. Customer devices 715 wirelessly connected to other customer devices 715, including secured locations 720, are also shown. A 90° single antenna customer device 725 is also shown. A customer device 715-1 may also incorporate a 5G radio and antenna that can be connected to any device to expand cellular data and voice coverage, or support the Internet of Things. As an option, dotted lines represent wireless connections that are established to improve redundancy and reliability in the event a device fails or to increase throughput.

FIG. 8 shows a network architecture 800 including devices 805 affixed to a remote gateway location 810 wirelessly redistributing signals to connected devices 805 at secured locations 815 and customer homes or businesses 820 in the area. Devices 805 are shown as cylinders attached near the top of various mounting structures 825 (e.g., towers and utility poles). Devices 805 can have one or more antennas allowing up to 360° of coverage. Devices 805 directly connected to remote gateway locations 810 or secured locations 815 can then wirelessly redistribute signals to additional customer devices 805. Secured locations 815 may be utilized in areas where it is critical to redistribute signals farther down a network leg. The secured locations 815 may also be fed directly from remote gateways 810 by high capacity backhaul 830 wired or wireless links.

In another embodiment, devices not directly connected to a remote gateway device utilize beacon information from neighboring devices to determine the best device which to connect to get back to a remote gateway. Devices may be configured to beacon only if a device is connected to the network and can ping a remote gateway or headend gateway location. Alternatively, devices may always beacon but have a value in the beacon telling nearby devices if the beaconing device is connected to the network or not. This can prevent devices from connecting to other devices that are not connected to the network. Device intelligence makes this architecture novel by allowing the entire network to dynamically reconfigure itself to: minimize interference, optimize throughput, circumvent network outages, increase redundancy and reliability, and reduce capital expenditures for: towers, PTMP capacity increases and backhaul upgrades. Every time a new device is installed, network coverage, distance between devices and data rates to nearby devices can improve. Installation requirements may be set in such a way to prevent a device from connecting to another device as its parent unless the child device can see multiple other devices in a survey or a path back to a remote gateway. This option may be implemented to prevent a single device failure from stranding other devices downstream.

In another embodiment, the wireless internet access system is designed in such a way to allow portable customer devices and/or cellular devices to wirelessly roam on the network between devices while maintaining network connectivity using standards such as 802.11r, 802.11k, 802.11v, 802.11w or other industry accepted methods. As an option one or more VLANs may be utilized for the roaming network broadcast from every radio. As another option, all virtual access points may be configured with the same MAC address.

In another embodiment, by utilizing device hardware design, device software intelligence, passive scanning data and global settings/restrictions the wireless internet access system has the ability to automatically optimize network legs and reduce or eliminate single points of failure by allowing traffic to reroute around device, secured location, remote gateway or even possibly headend gateway outages while maintaining very high data rates throughout network legs.

In another embodiment, devices are designed to eliminate or minimize the need for technicians to align them. Antennas arranged in a way to provide up to 360° of coverage allowing any radio/antenna combination to operate as the uplink to a parent device. This feature is useful during installation and in the event a device's parent device goes offline for any reason. In that instance, the child device may automatically re-associate to a different nearby device instead of remaining offline until the device's current parent device comes back online. Additionally, if a device's parent device experiences degraded performance, the child device may decide to re-associate itself to another device, secured location or remote gateway nearby. As another option, device and network design may make it possible for a customer to self-install a device without a need for a skilled technician to perform the work. As another option, devices may utilize one or more alignment mechanisms to maximize wireless signal strength. The alignment mechanism may be integrated directly into the device enclosure or affixed to the device's mount. The alignment mechanism may consist of one or more motors such as stepper or screw drive motor(s) connected to a microcontroller or to the main host system board. The motor(s) can physically turn the device itself or individual antennas on either vertical, horizontal or a combination of both axes. A microcontroller can be utilized to control the motor(s) through serial TTY, serial RS232, i2c, SPI or any other peripheral device control protocol and controlled by the host board. A microcontroller may be integrated into the device's primary circuit board or a separate daughter board. The microcontroller may communicate with the host system board over serial TTY/RS232, i2c or SPI. The microcontroller can utilize survey data, signal strength, GPS information, device azimuth orientation, and compass heading in order to determine which direction and how much to turn a device in order to maximize signal strength to one or more other devices.

Figure 9:
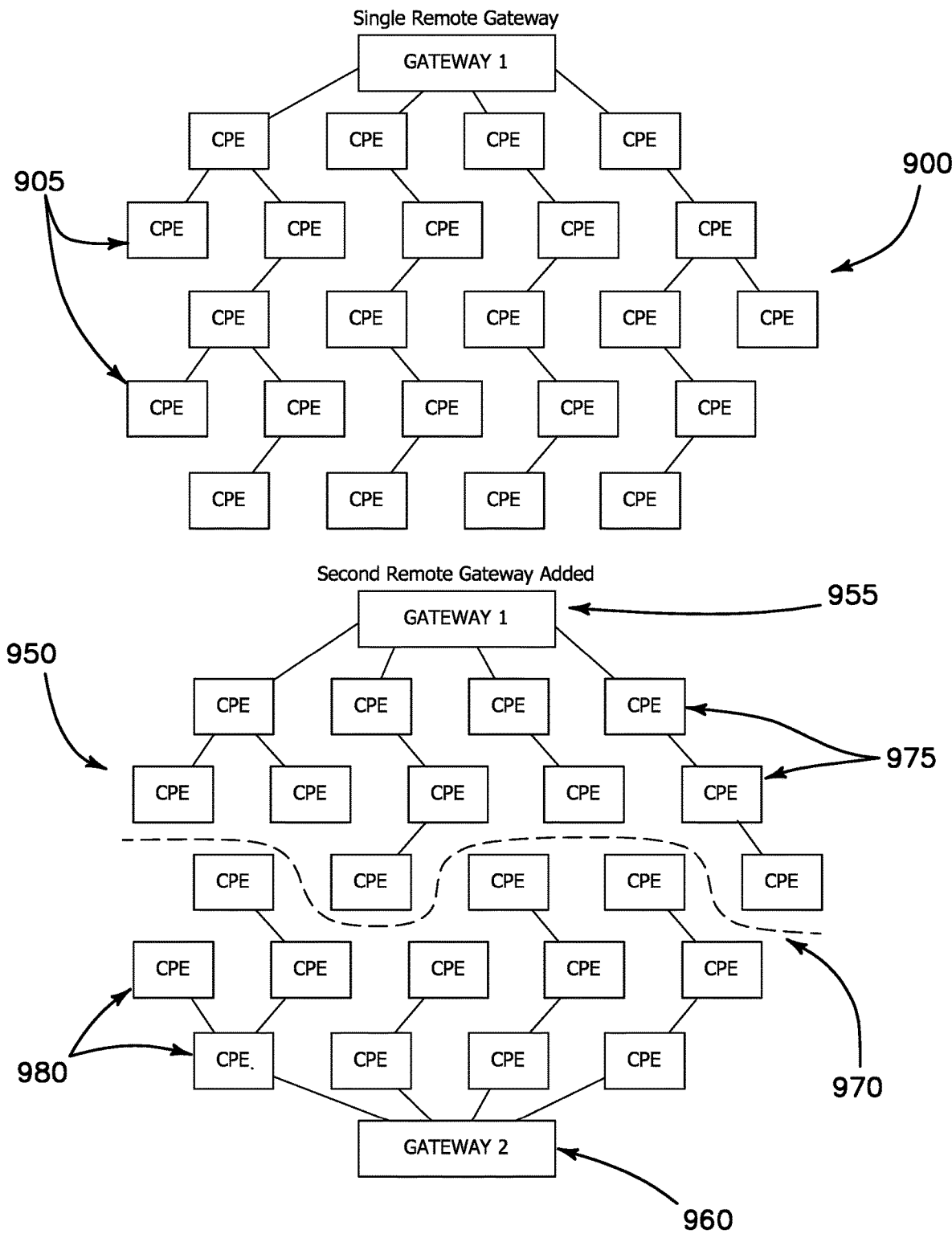
FIG. 9 illustrates a single remote gateway in an area with devices connected down network legs and a second remote gateway added in the same area shown rerouting itself automatically according to the embodiments of the present invention.

In another embodiment, when an existing remote gateway nears capacity, a new remote gateway location may be added in the network area. Once the new remote gateway is installed and online, nearby devices may detect beacons from the new remote gateway device(s) and automatically re-associate to the new remote gateway as shown in FIG. 9. This eliminates the need for expensive service calls to re-optimize a network after a new remote gateway is installed.

Now referring to FIG. 9, a single remote gateway 900 in an area with devices 905 connected down network legs is shown. In an alternative design 950, a second remote gateway 960 added in the same area allows some devices to reroute themselves without technicians needing to re-aim antennas or any user intervention. As shown, this can add capacity, shorten hop counts to remote gateways and improve performance. A dotted line 970 details how certain devices 975 detailed above can remain connected to remote gateway 955 while devices 980 below can reroute themselves to the newly added second remote gateway 960.

In another embodiment, as an option, the wireless interact access system is configured with remote gateway and secured location devices wirelessly connected to each other and customer devices may only be capable of connecting to remote gateway or secured location devices. Remote gateway devices in this option may be capable of rerouting network legs through other remote gateway devices as necessary to maintain optimum performance.

Conventional wireless internet access systems typically utilize beacons to determine data rates, channel widths, transmit powers and other operational parameters. In conventional systems, beacon data is primarily static data, only a few fields in the beacon update with new information and the data is used to optimize wireless connections, not to reroute them.

Figure 10:
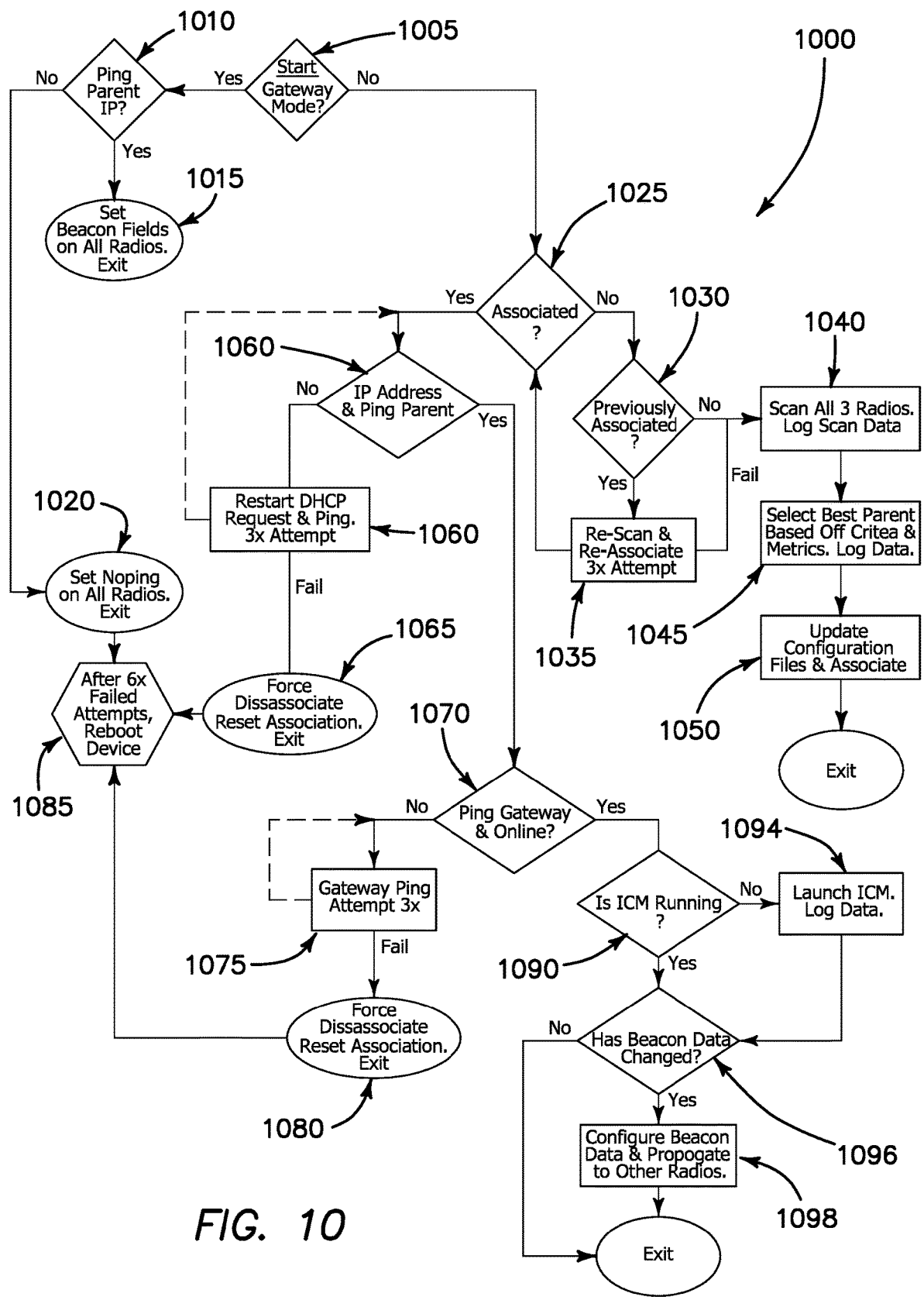
FIG. 10 illustrates flow chart detailing an exemplary method for selecting an uplink, associating to an uplink and setting beacon fields according to the embodiments of the present invention.

In another embodiment, devices in the wireless internet access system transmit beacon information to other nearby devices. Devices may transmit beacon data about themselves as well as beacon data from devices connected upstream and downstream of the beaconing device. Beacon information is one element driving this dynamic network architecture. Based on the beacon information compiled by a device, the device can make many decisions, for example selecting a new uplink device as shown in FIG. 10. Beacon values may be manually set by a user or automatically by a device. Some information that the devices may include in the beacons are, but not limited to:

Device Operational Mode—This value tells a scanning device the expected reliability of the beaconing device. For example, a device physically installed at a remote gateway location can be assigned a 1, a device installed at a secured location that is expected to be very reliable but not as reliable as a remote gateway location can be assigned a 2. Devices with excellent data rates, low hop counts and high network availability may receive a value higher than a remote gateway or secured location but lower than a device with poor data rates or higher hop counts. Device Operational Mode values can be penalized for packet loss, downtime, high customer counts and low data rates or various other reasons. This beacon data is used by nearby devices to determine if the beaconing device is the most desirable device to associate to at that time. Device Operational Mode values range from high quality desirable devices to very unreliable devices that a scanning device will avoid connecting to unless absolutely necessary to maintain network connectivity. Different Operational Mode values may be assigned in a manner to differentiate between devices that are offline for performance related issues compared to, for example, a power outage in a large area. This can ensure Device Operational Mode values are not unfairly penalized for non-performance related outages. A device that is constantly powered down by a customer on the other hand is severely penalized for unreliability while a device that is currently offline may receive a maximum penalty value.

Hop Count—This value tells nearby devices how many other devices are between the beaconing device and the device's remote gateway location. A device may be configured to try and associate with a device with the lowest Hop Count value.

Direct Connect, Downstream and Upstream Customer Counts—These values can tell nearby devices how many devices are directly connected to the beaconing device, how many customers the beaconing device supports downstream per radio and how many devices the remote gateway device upstream of the beaconing device supports. This can help nearby devices choose parent devices to avoid congested network legs and ensure radio resources are utilized as efficiently as possible without creating bottlenecks.

Upstream Data Rate—This value can tell nearby devices the lowest data rate value from the beaconing device to the remote gateway. This helps a device determine if there is adequate bandwidth available for nearby devices to associate to the beaconing device. Devices may also beacon out radio data rates and/or spatial streams and/or channel widths, or as another option, data rates, spatial streams and channel width values may be referenced through a rate index table that can be referenced to provide a single value per combination of data rate, spatial stream and/or channel width.

IP Address—This value contains information on one or more of the IP addresses of a device or the device's remote gateway device. This value can help a device determine if the beaconing device is on the same network or subnet, potentially telling the device receiving the beacon that it may be possible to switch to the beaconing device without dropping a connection.

Upstream Traffic Statistics—This is the maximum bandwidth utilized on the beaconing device's network leg. This value reflects the maximum data traffic on the network leg between a remote gateway device and the beaconing device. This is typically a measurement of traffic passing over the wireless link between the remote gateway device and the first connected device on the network leg.

Available Bandwidth—This value may be a computation of a wireless link's total data capacity minus its current (or average or peak time) wireless data usage. This value may be beaconed as the minimum, average or maximum available bandwidth. A device in a network leg may beacon out its own available bandwidth or as another option the device may beacon out the lowest or highest available bandwidth value of all wireless links between itself and a remote gateway location. This value can help a device receiving the beacon determine if there is enough available bandwidth for the device receiving the beacon and its children to migrate to the beaconing device without overloading the beaconing device or another device further up the wireless leg.

Backhaul to Headend Available Bandwidth—Additionally, a device may beacon out the available bandwidth on its wired or wireless remote gateway to headend link upstream. This may help ensure remote gateway wired or wireless backhauls to headend gateways do not get overloaded by a device or devices deciding to switch to a different remote gateway that does not have the backhaul capacity to support the new device or devices.

Figure 11:
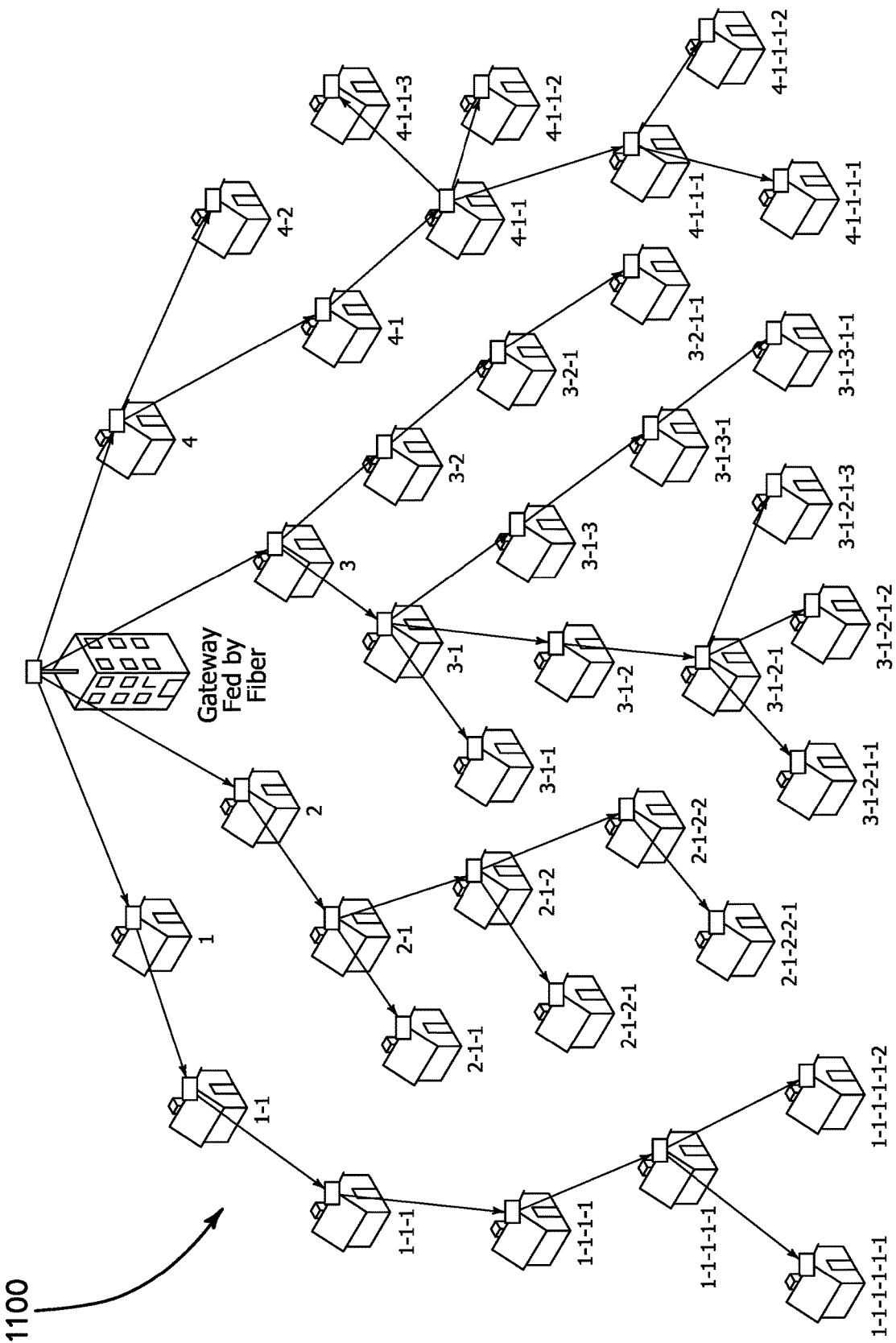
FIG. 11 illustrates a method for assignment of unique network IDs per device according to the embodiments of the present invention.

Unique Network ID—Unique network radio legs may be assigned Unique Network IDs. This may be used to help devices determine what other devices they can and cannot associate with to prevent network loops or stranding groups of devices. A method 1100 of assigning Unique Network IDs is shown in FIG. 11. Unique Network IDs are important to prevent stranded devices. For example, if a device #2 of a network leg is allowed to connect to a device #6 further down the same leg, device #2 and all its children devices would become stranded without a connection to a device #1. As an option, the Unique Network ID can be the Virtual Local Area Network (VLAN) ID of a device. This may allow a device to determine what network leg the beaconing device is currently on. As another option, the Unique Network ID can be a combination of a portion of the remote gateway device's radio MAC address combined with a sequence of numbers, wherein the sequence of numbers can be assigned in the same manner as shown in FIG. 11. In this option, if the MAC address and number sequence match, a device is not allowed to connect to the matching device. In the event of an outage, hop counts can potentially get very long to maintain connectivity. This can potentially exceed the character limit of the Unique Network ID value. As an option in this scenario, after a certain quantity of hops, devices may remove first hop values to stay within character limits of beacon values. Another option for networks with large hop counts and long path IDs may be for a device to query a network monitoring system to obtain dependencies of devices to ensure the device does not attempt to connect to another device lower down on the same network leg. As another option to prevent a network loop, a scanning device can determine what devices are below the scanning device by analyzing information present in the 802.1d bridge group using the brctl utility table in the linux kernel to show mac addresses and the corresponding interface ports they are connected to. Devices upstream of the scanning device have a mac address entry in the bridge group corresponding to the uplink interface of the scanning device, devices downstream of the analyzing device have a corresponding mac address entry tied to the other AP interfaces. Traffic must pass through this device to have information populated in the bridge table. In this option, the scanning device then prevents itself from connecting to a downstream device on the same network leg. To further clarify this technique, every device within the network contains at least one bridge group for switching layer-2 traffic between the wireless interfaces and/or wired interfaces on a device. The bridge group can contain a primary IP address and a corresponding primary mac address. The primary mac address of the bridge group can be added to the beacons generated by each radio. Scanning devices can now identify the primary mac address received within the beacon during a network scan and query this mac address against their local 802.1d bridge table to determine if it is upstream or downstream. The bridge table lists mac addresses on the local layer-2 segments and which interface they are reachable on (e.g. wireless radio, ethernet port, etc.). If a mac address seen during a scan is found in the uplink (client) interface, that particular device is upstream in the network topology. If the mac address is found on the Access Point ports of the scanning device, it is downstream of the scanning device and should not be connected to. As another option, every device reports all mac addresses of its corresponding radios and ethernet ports to a network management system. This network management system can be used to generate a dependency tree such that each device can download a network hierarchy structure returned by the network management system and utilize that data to determine which beaconing devices found in a network scan are upstream or downstream from the scanning device.

Orientation Azimuth—This may broadcast the magnetic or true north orientation of a device. This value may be used to determine optimum installation orientation or also to calculate expected signal level between two devices to determine if any obstructions may be in the path between the two devices while accounting for antenna gain fall off as the azimuth delta increases from the antenna centerline.

Transmit Power—Individual radio transmit power levels may be broadcast in the beacon. This may be useful if a device needs to connect to another device that is currently transmitting in a frequency band with lower power limitations (either regulatory or hardware limited). The device attempting to connect to the other device may request that the other device change channel to a higher power channel to provide a link with a higher data rate.

Antenna Gain—Individual antenna gains may be broadcast in the beacon.

Antenna Azimuth—Individual antenna azimuths may be broadcast in the beacon.

GPS Coordinates—This value may come from a GPS receiver in a device. The GPS data may be beaconed as the latitude, longitude, and elevation in a variety of formats as necessary. Devices may use GPS coordinate and Orientation Azimuth data to determine expected signal levels of a wireless link.

No Ping—This value may be included in the Device Operational Mode or a standalone beacon value. The value may be set or unset based on whether a device can ping another specified device such as a remote gateway, switch, router or another device. If the value is set, a device may be configured to either: not beacon at all, or as another option, beacon that the device is not currently connected to a network. These options can prevent nearby devices from attempting to connect to the offline device until the offline device's network connection is restored and the No Ping value has been unset.

FIG. 10 shows a flow chart 1000 detailing an exemplary method for selecting an uplink, associating to an uplink and setting beacon fields. At 1005, it is determined if a gateway node is active. If so, at 1010, the parent IP address is pinged. If responsive, at 1015, the beacon fields are set on all radios. If not, at 1020, no ping is set on all radios. If no gateway node at 1005, at 1025 it is determined if the device's uplink radio is associated to a parent device. If not, at 1030, it is determined if the uplink radio was previously an associated to a parent device. If so, at 1035, three attempts to re-scan and re-associate to the parent device are conducted. If not, previously associated to a parent device, at 1040, the radios scan for other devices and scan data is logged. At 1045, the best parent device based on metrics is selected. At 1050, the configuration files are updated and the devices uplink radio is associated to a parent device. If associated at 1025, at 1055, the parent IP address is pinged. If no response, at 1060, restart the DHCP and ping up to 3 times. If no response, at 1065, force disassociate and reset association. If a response, at 1070, the gateway is pinged and a determine if whether the device is online. If no response, at 1075, the gateway is pinged up to 3 times. If no response, at 1080, force disassociate and reset association. After 1020, 1065 or 1080, at 1085, after 6 failed attempts, the device is re-booted or physically power cycled through the use of a power system. If a response at 1075, at 1090, it is determined if Intelligent Channel Management (iCM) is running. If not, at 1094, the iCM is launched and data is logged. At 1096, it is determined if beacon data has changed. If so, at 1098, the beacon data is configured and propagated to other radios. Upon exit at any point, the process is restarted at 1005.

In another embodiment, upon boot up and periodically thereafter, devices passively scan all radio and antenna combinations to determine channel usability, interference and collect beacon information per antenna direction. This data may be compiled in such a way to create a channel map and interference table for each radio and antenna combination. For example, if a device can see a remote gateway device, a secured location device, or another customer device, but is not directly connected to those devices, the device may be configured to automatically exclude that channel(s) from being used on that particular antenna. As another option, iCM may be utilized to give channel and channel width allocation priority in a network based on hop count from a gateway location with gateway devices receiving the highest channel allocation priority and/or priority may also be based on either direct or indirect customer counts associated to each radio. This ensures that radios with the most customers are given the highest channel allocation priority to select the best possible channels with the least amount of interference. Additionally, these scans may detect new customer devices, remote gateway devices or secured location devices (that became part of the network since the last scan was performed) that may be more desirable for the scanning device to associate with.

In another embodiment, devices can be manually triggered for a rescan event at any given time. Alternatively, devices may automatically passively scan at certain times. In the event passive scanning degrades device performance, passive scans may be scheduled to occur at a specific time or interval when network usage is low, such as every day at a specific time such as 2 AM, or once every 24 hours or on a specific day of the week such as Thursday. When a scan is initiated, the scanning device can analyze all nearby device beacon data, compile that data, then determine if a different parent device is desired. A device may require a certain score improvement over the device's current parent device to decide to switch to a new parent device. This may be done to ensure devices do not make uplink changes that do not significantly improve performance. As another option, devices (including remote gateway and secured location devices) may be configured to allow technicians to trigger a rescan of all devices below the device triggering the rescan down a network leg. This can be a useful tool to allow parts or entire network legs to re-optimize performance if they are under performing.

In another embodiment, remote gateway devices or other devices may be configured to transmit certain settings and/or limitations to children or parent devices. These settings may include but are not limited to:

Channel plans telling devices in an area to utilize specific channels and exclude others. This can allow specific channels in an area to be reserved for other networks, backhaul devices, 3$^{rd}$ party devices or any other reason;

Maximum or Minimum Transmit Power levels. This can prevent devices in urban or other dense areas from transmitting at very high TX powers where spectrum reuse is important or desired and signal levels between parent and child devices are not a concern, or require a minimum transmit level in more rural or less dense areas where spectrum is not as big of a concern as good signal levels at farther distances;

Minimum or maximum number of directly connected devices. This can prevent devices from supporting too many other devices or it can prevent too few devices from being connected to a radio or device in denser areas using up frequencies unnecessarily;

Minimum or maximum channel widths. This can be useful to prevent devices from attempting to utilize wide channel widths in areas of known interference;

Maximum speeds per device. This can allow for bandwidth management such as over subscription ratios as well as be adjusted based on available network resources;

A certain burstable amount of data for a customer to have service levels above their plan speed for a certain duration time or quantity of data or packets;

Beacon and uplink selection variables to tune network performance by weighting certain factors more than others in different areas;

Prioritization levels for classes of service (commercial business customers, emergency responders, etc.); and any other desired setting or restriction.

In another embodiment, devices of the wireless internet access system utilize dynamic uplink selection. Devices analyze previously mentioned beacon information, passive scanning data, and global settings and restrictions to determine the best parent device to connect to. The dynamic uplink selection process can utilize score based multiple-criteria decision analysis (MCMA). Once a device collects scan results from all relevant radios, the scan data can be put into a weighted decision matrix (WDM). Every potential uplink device is given a perfect starting score. Devices are then excluded if they are offline or a child of the device selecting the new uplink. The remaining device beacon values are individually weighted and then subtracted from the maximum score based on: signal strength, wireless link capacity, data rates, average and peak throughput utilization, available bandwidth, connected customer counts, hop count, noise floor, radio transmit power, antenna gain, antenna azimuth, interference, packet error rate and operational mode. During this weighted penalty scoring, the device must also score itself and factor in how its score will impact the new uplink if associated. The WDM can then be sorted by highest to lowest final score and the first entry can be selected as the most optimal uplink as shown in FIG. 12.

Figure 12:
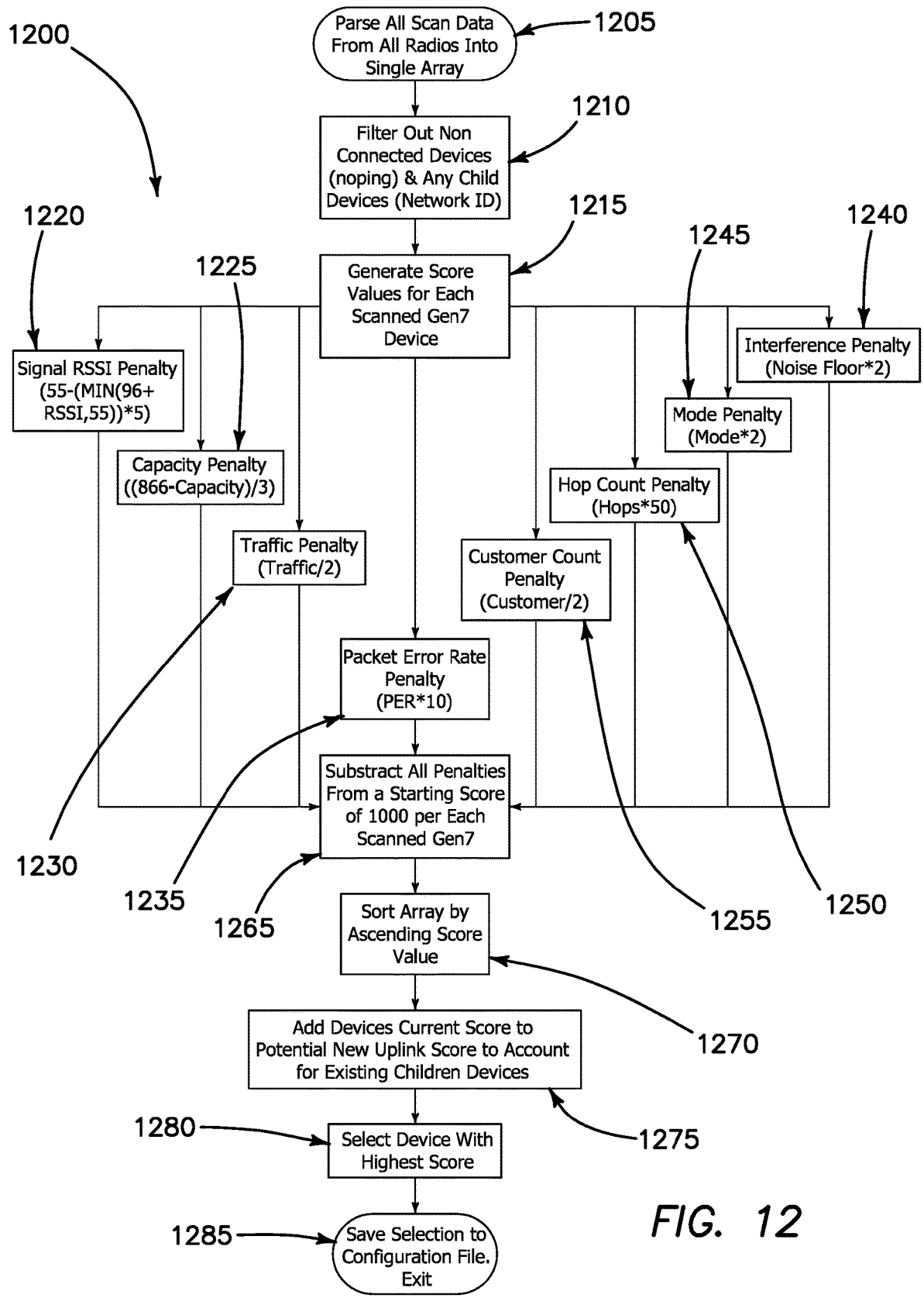
FIG. 12 illustrates exemplary uplink selection criteria according to the embodiments of the present invention.

FIG. 12 shows an exemplary of uplink selection criteria 1200. At 1205, all scanned data is parsed from all radios into a single array. At 1210, non-connected devices and any children devices are filtered out. At 1215, score values are generated for each scanned Gen7 device using a myriad of criteria including signal RSSI penalty 1220, traffic penalty 1225, capacity/data rate penalty 1230, available bandwidth penalty 1235, interference penalty 1240, mode penalty 1245, hop count penalty 1250, customer count penalty 1255 and packet error rate 1260. At 1265, all penalties are subtracted from a beginning score (e.g., 1000). At 1270, the array is sorted by ascending values. At 1275, each device's current score is added to a potential new uplink score to account for children devices. At 1280, the device with the highest score is selected. At 1285, the device selection is saved to a configuration file.

In another embodiment, as an option, devices may be configured to automatically determine and select a new parent device upon boot up or as necessary, during normal operation. Another option may be to only allow devices to select a new parent during low utilization times (i.e. early morning hours) to reduce service disruptions, an exception to this may be if link quality has degraded to a certain level wherein a device can be permitted to select a new uplink as necessary and at a predetermined threshold. Another option is for a device to only be permitted to select a new uplink when there is no data passing through the device via local connection or wirelessly to downstream devices. Another option is for a device to only select a new uplink if the new uplink's weighted score is a certain amount higher than the devices current uplink score. As another option, GPS data and Orientation Azimuth (whether provided automatically via GPS or manually through an address or installer input) may be used by a device to calculate distance between devices and an expected signal level. Devices may be configured to connect to the closest device. The GPS and Orientation Azimuth data may also be compared to actual signal levels to determine if there are any obstructions in the line of sight path between the two devices, this may be useful because it is often more desirable to have a slightly worse, clear line of sight signal compared to a better, non-line of sight signal firing through an obstruction. As another option, manual parent selection may also be utilized if necessary.

In another embodiment, devices are configured in such a way to dynamically select a parent device based on existing device loads on network legs in the area. This is advantageous because loading one network leg can provide better performance and reduce interference compared to several unloaded network legs. Fewer radios transmitting consistently on fewer channels is usually more desirable than more radios transmitting sporadically on more channels. As another option, a device may score itself and account for its own connected customer count, existing traffic statistics, signal levels, available bandwidth from a remote gateway to its headend gateway (particularly if there are path options leading back to more than one remote gateway) and other metrics when selecting a new uplink. This may be done to prevent a heavily loaded device from choosing a new uplink only to immediately overload the new uplink device. This can also cause a device to constantly switch back and forth between uplink devices which can degrade performance.

In another embodiment, as an option, devices are configured to select a parent device based on signal levels. Devices may associate to the device with the strongest signal level regardless of hop count or other factors. This may be done to maintain high data rates or as a last resort for a device to maintain connectivity.

In another embodiment, an uplink selection dampening system may be implemented to prevent all child devices below an offline device from attempting to dynamically select a new parent device at the same time. One way this dampening system can be implemented is by setting a certain network switch delay value based on a device's hop count from its remote gateway.

In another embodiment, as an option, devices transmit beacons at various data rates and packet sizes. This may be useful for devices to determine which nearby beaconing device receiving the highest data rates for given packet sizes. Using this data, a device may be able to determine with a high likelihood, the best device to associate to before associating.

In another embodiment, as an option, a device connects to all neighboring devices, one at a time or all at once, sample data rates and then decide which parent device can provide the best quality connection. This may be done on boot up, automatically or as necessary.

In another embodiment, as an option, a device is allowed to connect to multiple other devices simultaneously as shown in by the dotted lines in FIG. 7. This may be configured in such a way to improve redundancy and reliability in the event a device fails or to increase throughput. As another option, this may be useful to load balance traffic on an individual device level. Traffic in this configuration may be routed, switched or both. As an option, some sort of wireless lag may be utilized to increase the potential throughput of the device connected to multiple parents.

In another embodiment, as an option, networks are configured for devices to quickly switch remote gateway paths back to a headend gateway location without disconnecting or disrupting traffic. This may be accomplished using various routing protocols or potentially having a device connected to more than one parent device at the same time.

In another embodiment, as an option, devices report GPS, compass information and channels per radio (which can provide individual azimuths and channels for all antennas in a device) back to a centralized location. This collected GPS, compass and channel data may then be used by devices to specifically determine which other device antennas radiation pattern(s) the device antennas may overlap. Based on this analysis, the device determines which specific channels to use or avoid and also can allow for coordinated transmissions with the device overlapping coverage.

In another embodiment, customer tunnels are created to secure customer data transmitted through the wireless internet access system. The outlined methods below strive to maintain full line speed for customer termination, minimizing user space or kernels to interrupt interaction between devices on each node in the system which can degrade performance, throughput and increase latency. Various methods of implementing customer tunnels or termination may be implemented including but not limited to: PPPoE, l2tp, ENAT (1-1 NAT Public to Private translation), PPTP, OpenVPN, DHCP, MPLS Switching, IPoE, static or dynamic VLAN per customer. Authentication can be provided by the above protocols through industry standard authentication method such as a RADIUS server. Devices may incorporate hardware capable of offloading tunnel encryption that historically has been done with software. This can allow for secure tunnels to be created and utilized such as IPSEC while retaining full line speed performance.

Another feature of the internet access system is the ability of devices to behave as a wireless switch in trunked mode, passing 802.1q tags on both an ethernet segment and a wireless segment, which can also do double-tagging known as Q-in-Q. This VLAN trunking feature allows many options for network design of both routing and customer data transport. VLAN trunking can be utilized in a full-offload mode or a partial-offload mode. In partial-offload mode, a kernel can map VLAN IDs between network interfaces in logical bridge groups if layer 2 traffic shaping or filtering is desired. In full-offload mode, there may be direct interaction between wireless and Ethernet components without the need for kernel interaction, this can prevent unnecessary interrupts from degrading performance. To support VLAN trunking capabilities, Ethernet switches and wireless radios may accept packet sizes greater than 1500 bytes to prevent Maximum Transmission Unit (MTU) fragmentation on customer interfaces.

The wireless radios in devices can run AES encryption using WPA-PSK2, or other industry standard encryption methods which do not require additional encrypted tunnels to secure the network payloads and still be compliant with industry standard security procedures. Additionally, each device within a network between each wireless link can employ unique encryption keys per radio for added security. As an option, wireless encryption keys may be generated by hashing a unique identifier of a radio. Each virtual access point per radio can also have its own encryption key generated.

As cited above, an individual VLAN per customer may be employed and utilized with a RADIUS server utilizing 802.1x, to provide VLAN ID provisioning in a centralized system for improved management. Industry standards for authentication such as use of IPoE and/or DHCP can utilize DHCP option 82 to identify a subscriber's virtual or physical port for authentication.

On the backbone layer between remote gateway locations and a headend gateway location, VLAN trunking and MPLS switching can be done in hardware commercially, allowing full 1-100 GB/s line speed operation on a variety of hardware types to maintain high throughput without latency or degradation of service. This architecture allows for traffic to be transported over metro Ethernet style switches at remote ends using 802.1q or MPLS to the headend gateway where more complex Q-in-Q tagging, or MPLS termination can be done to give the network operator the ability to provide enhanced business private-line services over the network between remote offices. Using OSPF between metro Ethernet switches with MPLS allows the network designer to build logical rings to improve redundancy between remote gateway to headend gateway connections and between remote gateway to remote gateway connections.

In another embodiment various network routing protocols are used to control traffic flows and packet routing through the network. Various protocols may be used including but not limited to: OSPF, MPLS, BGP, RIP, IS-IS, EIGRP, VLAN, MPLS Switching and Static Routing.

Industry standard WDS (Wireless Distribution System) can be utilized between wireless devices to provide bridging between devices. It can also provide bridging between radios in the same device and from customer device all the way to a remote gateway. WDS allows each node to pass 4-frame addresses. This allows a wireless bridge to be passed through several wireless links. Without WDS, which allows a source, destination, fromDS and toDS fields, traffic cannot be bridged through more than a single wireless link without using a proxy arp method of bridging. Without WDS, every device needs to be a router within the network. This can add additional latency per wireless link compared to simply switching packets between wireless and wired interfaces. As an option, any layer 2 tunneling protocol may be encapsulated by MPLS and used for customer termination. One example of a network architecture may be to implement PPPoE and MPLS from a headend gateway to a remote gateway, then utilize VLAN trunking from the remote gateway to customer devices, potentially passing through one or more customer devices before reaching the destination customer device. A core or edge router could be utilized to route public IP blocks that can then be dynamically assigned through a PPPoE access concentrator to individual devices utilizing IPv4 and/or IPv6, as two tunnels can be created at the same time between the access concentrator and the customer device. Some network hardware devices such as a Cisco 7200VXR can support over 6000 PPPoE tunnels allowing for scalability. Traffic accounting, authentication and traffic shaping can also be enforced through the use of the Cisco 7200 VXR Router. Customer packet or rate shaping may be done at the headend of a network, a remote gateway or through a devices data or radio ports.

Another option may be to implement MPLS from a headend gateway location all the way to a customer device, potentially passing through one or more customer devices before reaching the destination customer device. This may be desirable for configurations such as a business with multiple office locations. An edge-router such as a Brocade MLX can then assign a virtual IP address to the VLAN encapsulated into the MPLS tunnel and announce the assigned IP block over BGP to the Internet tied to the VLAN interface.

Figure 13A:
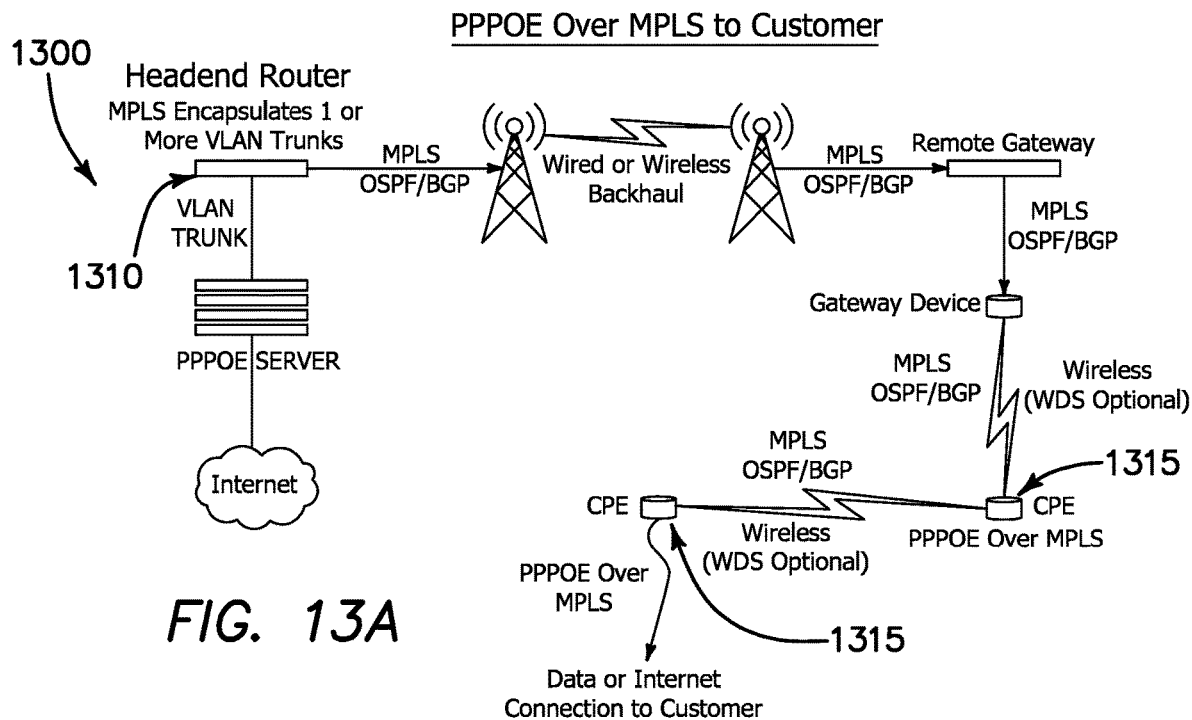
FIGS. 13A & B illustrates exemplary methods of creating customer tunnels according to the embodiments of the present invention.
Figure 13B:
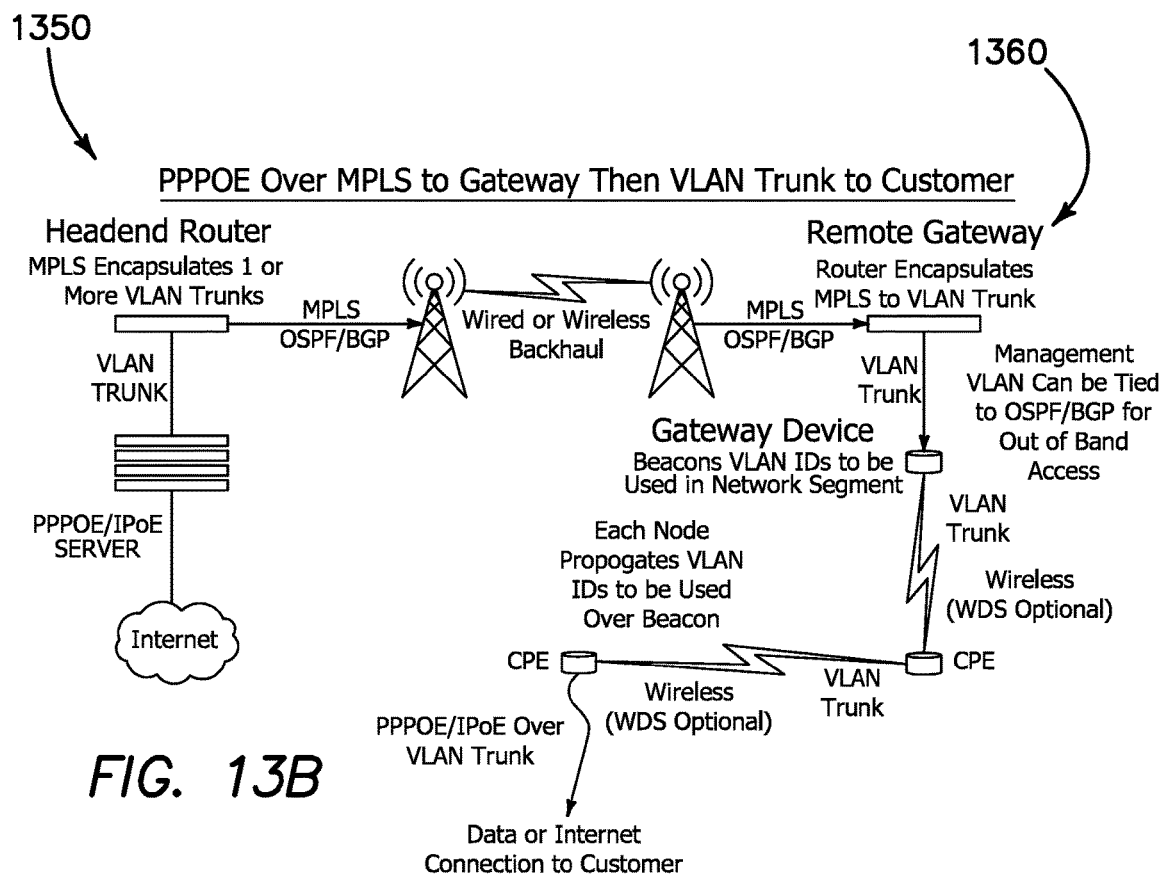

FIGS. 13A and 13B show two methods of creating customer tunnels. FIG. 13A shows a diagram 1300 detailing a PPPOE tunnel over MPLS from a headend gateway location 1310 all the way to a customer location 1315. FIG. 13B shows a diagram 1350 detailing a PPPOE/IPoE tunnel over MPLS from a headend gateway location to a remote gateway location 1360 then convert to a VLAN trunk from the remote gateway to a customer device location. VLAN's and MPLS attributes may have the ability to traverse multiple wireless connections before reaching the desired destination device.

As shown in FIGS. 13A and 13B, network architecture utilizing MPLS from a headend gateway location to a remote gateway location transporting one or more VLAN's to and from the headend gateway location to the remote gateway location can be utilized with an IPoE solution similar to PPPoE above. IPoE does not have any MTU overhead and can utilize industry standard DHCP. Authentication can be done using a switch that natively supports DHCP option 82 identifiers (such as a Juniper MX80 switch/router) allowing the use of a RADIUS server. The wireless management network can be on one network VLAN and the customer termination VLAN can be directed towards the switch/router for all customer devices in that particular network segment. The switch can hand out IP addresses from an assigned IP pool, similar to PPPoE. Traffic accounting, authentication and traffic shaping can be enforced on the switch/router.

If VLAN trunking is not possible due to legacy equipment within a network, another option may be to use an ENAT protocol as developed by DigitalPath, Inc. ENAT utilizes a 1-1 NAT protocol in combination with source routing on the network. This protocol relies on a client with a heartbeat on a device to send subscriber credentials over the network to a designated access concentrator. The access concentrator compares customer credentials against an authentication server such as radius and returns an accept or reject value. Upon successful comparison, the access concentrator can then assign an available IP address outside of its IP pool and then directly do a 1-1 NAT translation between the public and private network IP address of the device. In this option, an OSPF network core is used and the OSPF network core can identify specific network sources and re-direct traffic to and from the access concentrators based on the destination subnet in real-time.

As network sizes increase, a protocol daemon can be used between the headend gateway and remote gateways that can be responsible for dynamic VLAN assignments between the MPLS switches and remote gateway wireless devices. A new device added to a remote gateway can simply do a request to a VLAN assignment server and request an ID. This daemon can also configure an on-site metro Ethernet switch for a VLAN trunk ID's assignment and auto-configure the network switches upstream to recognize the new VLAN ID to be utilized. By doing this, manual VLAN assignment and management may no longer be necessary. Dynamic VLAN assignments can be automatically triggered from something as simple as a DHCP relay request from a remote gateway device or a DHCP relay request from the metro Ethernet switch providing MPLS and VLAN trunking to the remote gateway device. DHCP requests may have attributes appended to them from the source device doing the request, such that both the end port on the metro Ethernet switch can be identified and the remote gateway device IP address can both be linked to the same request.

In another embodiment, devices in the wireless internet access system have built-in network intelligence. Devices may have the ability to reroute network traffic on the fly in the event of: a device outage, interference, signal degradation, a device becoming unreliable, a churned customer, an overloaded network leg, the addition of a new remote gateway or device, or various other reasons. For example, if a particular area begins receiving interference from another device in the network or a $3^{rd}$ party device, radios and specific antennas in nearby devices that are receiving interference from the interfering device may raise their noise floor or interference beacon values. This can tell nearby devices to avoid connecting to that specific antenna unless absolutely necessary and to reroute traffic around the area of interference as shown in FIG. 14.

Figure 14A:
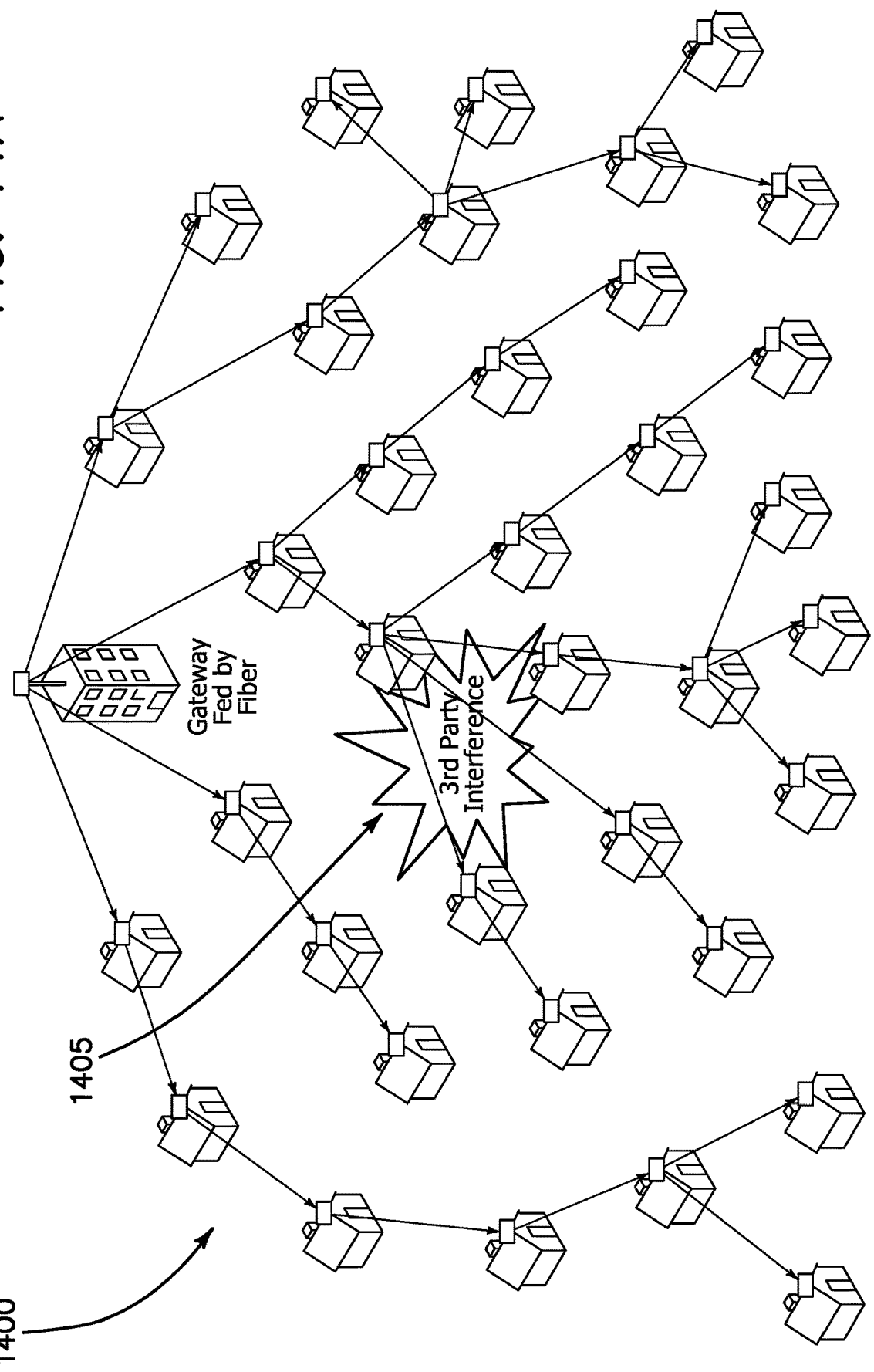
FIGS. 14A & B illustrates existing network connections and a new area of $3^{rd}$ party interference and system capability of intelligently rerouting wireless connections to avoid the area of $3^{rd}$ party interference according to the embodiments of the present invention.
Figure 14B:
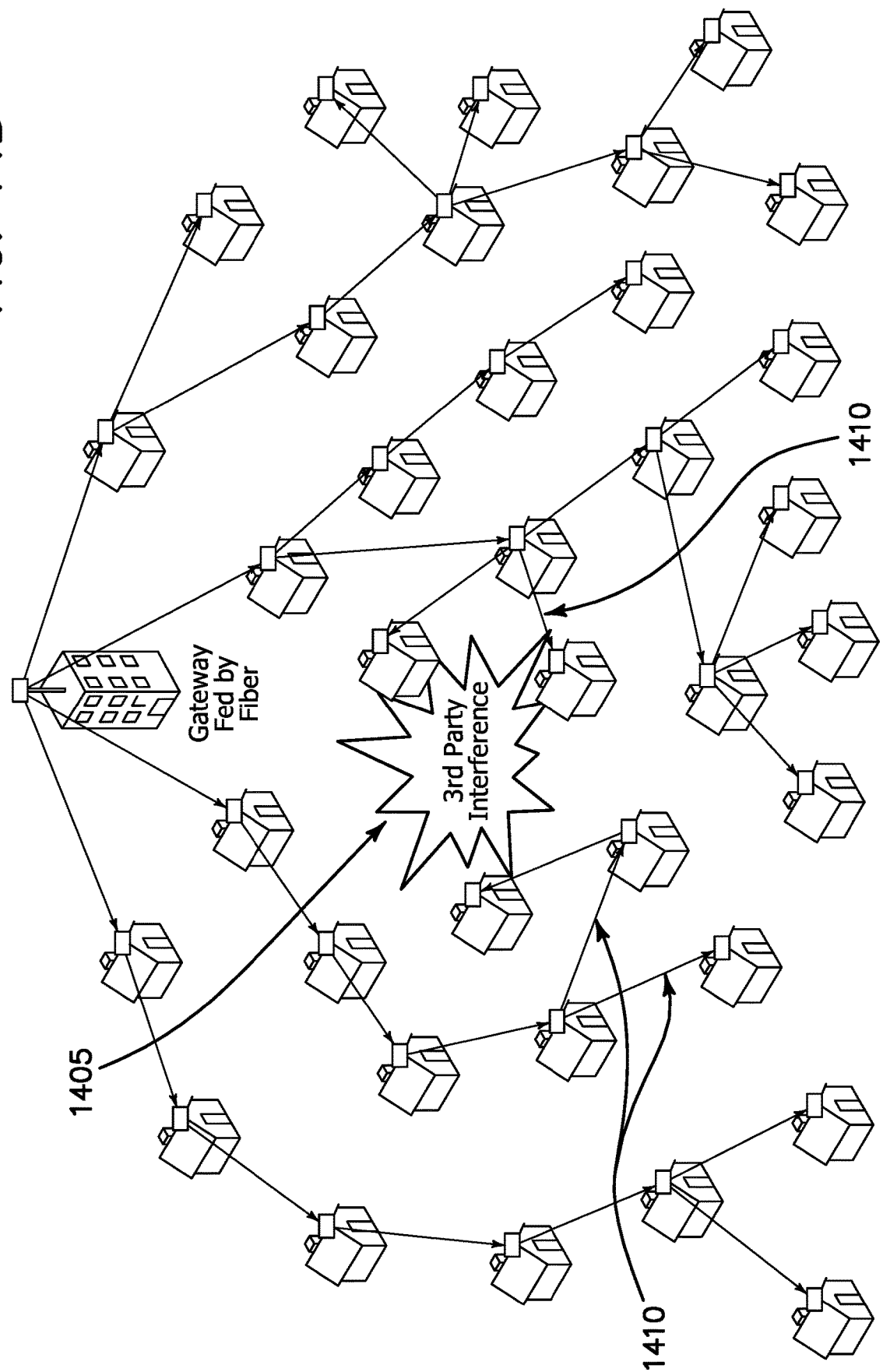

FIG. 14A shows existing network connections 1400 and a new area of $3^{rd}$ party interference 1405. FIG. 14B shows how the wireless internet access system is capable of intelligently rerouting 1410 wireless connections to avoid the area of $3^{rd}$ party interference 1405 as much as possible.

In another embodiment, radios utilize multiple VLANs and/or broadcast multiple SSIDs. This may be useful to support hotpot access, wireless device configuration by a technician or $3^{rd}$ party licensees to connect to a network. As an option, devices may utilize a unique VLAN per radio SSID. Devices may also be assigned multiple VLAN IDs that may be used for various purposes. For example, one VLAN ID can be used for device management by technicians, another VLAN ID may be used for customer traffic, another VLAN ID may be used for hotspot access and additional VLAN IDs can be used for each radio SSID and broadcast wirelessly identifying every radio in a device. VLAN IDs broadcast out in beacon data may also be used to preconfigure a network configuration on a device before the device associates to a new parent device. A large range of VLANs can be dynamically allocated as necessary over the beacon (e.g. VLAN 100-4095) to provide per-device VLAN services as well. This can potentially improve uplink switching times.

In another embodiment, devices automatically change channel (Auto Channel) on a per radio, per device or per network leg layer. Auto Channel may utilize passive scan data compiled over a period of time to build a channel map per radio or antenna. A device may trigger an Auto Channel event if certain interference or performance thresholds are reached. Examples of trigger events may include but are not limited to: excessive packet loss, low data rates, or a change in an existing channels noise floor.

In another embodiment, devices automatically adjust individual radio channel widths as necessary. Common channel widths currently in use are 3, 5, 7, 10, 20, 40, 80 and 160 MHz. Some examples of reasons for a device to change radio channel widths are: interference preventing maximum channel size, quantity of devices associated to a radio does not require maximum channel size, or radio throughput demand increases or decreases. Radios may have the capability to bond multiple contiguous channels together to create a larger usable channel (Channel Bonding). Radios may also have the capability to bond multiple noncontiguous channels together to create a larger usable channel (Carrier Aggregation).

In another embodiment, devices automatically adjust radio transmit power based on passive scanning data, signal levels received at the other end of a link, distance calculated between connected devices, or on a global setting level for a particular area. As an option, radio transmit power levels may increase or decrease based on channels used and regulatory maximum allowable levels.

In another embodiment, a device tells other devices to avoid trying to connect to an antenna or a radio. The device may do this because an antenna or radio is receiving interference, a radio, antenna or device is overloaded with too many customers connected, or any chains of a radio are currently functioning as an uplink for the device. When a radio operates as an uplink and a downlink simultaneously on any chains, performance may degrade. To notify other devices to avoid a device or radio or antenna, the device may weight beacon values in such a way that the other devices do not connect to them unless absolutely necessary to maintain connectivity. This may be done manually by a remote technician or real time by the device itself based on network factors. As another option, a device may be able to completely disable a radio automatically or through user intervention. This can be accomplished on an 802.11 type radio by manipulating chain masks. This can prevent a radio or radios from transmitting and adding unnecessary interference into an area when individual antennas do not need to be transmitting.

In another embodiment, devices utilize a radio resource management system. Some ways this wireless internet access system may be configured are to: limit one or more connected devices throughput, prioritize or deprioritize a connected devices air time and/or throughput, monitor various radios metrics to ensure proper radio functionality, attempt to recover radio functionality in the event of a problem or failure, and monitor radio temperatures.

In another embodiment, devices utilize a spectrum analyzer to determine available channels on a per radio or per device basis. This spectrum analyzer may have the ability to scan real time without impacting performance or disconnecting wirelessly connected devices. Alternatively, a remote technician may run a spectrum analyzer to determine a cause of interference or to manually adjust parameters of radios. Spectrum analyzer data may be displayed in a number of different formats including but not limited to waterfall, waveform and real time.

In another embodiment, a NMS may be utilized to monitor device information such as GPS location, device uptime, assigned username and password, IP address, subnet mask, channels, MAC addresses, network dependencies, transmit powers levels, signal and noise levels, data rates, tunnel uptimes, uplink changes over time periods, traffic (both wireless and wired), active and inactive radios, connected customer counts and various other device metrics. SNMP may be used to collect information reported from network devices.

In another embodiment, every time a device connects to a network or an uplink is selected, the device may report in its GPS coordinates and all other performance data to the Network Monitoring System. A mapping system may pull this data and create a visual map of devices, wireless connections, signal levels, network traffic flows and highlight any problem areas or devices.

In another embodiment, the NMS may be configured to display all devices that are disconnected from a network. Additionally, the NMS may be configured to display all devices that can only see a single other device in the network.

In another embodiment, devices report passive scanning data into the Network Monitoring System. This may be used to show options for manually rerouting traffic in areas of congestion, or what a network could look like.

Although the invention has been described in detail with reference to several embodiments, additional variations and modifications exist within the scope and spirit of the invention as described and defined in the following claims.

We claim:

1. A network access device comprising:
   one or more directional antennas oriented to provide up to 360-degrees of signal coverage, said one or more directional antennas connected to one or more radios;
   said one or more radios each operating on a same channel or independent channels dependent upon said one or more radios or said one or more antennas;

said one or more directional antennas and said one or more radios and other network access device components being housed in an environmentally protected enclosure, said enclosure configured to prevent RF energy from entering or exiting except through said one or more directional antennas, said one or more radios each further recessed into metal enclosures within said environmentally protected enclosure to minimize cross talk between said one or more radios; and wherein said network access device is configured to distribute network access to and from the device location to other nearby geographic locations wirelessly through said one or more radios.

2. The network access device of claim 1 further comprising one or more MIMO configured radios and antennas.

3. The network access device of claim 1 further comprising one or more interfaces configured for fiber optic or copper network connectivity.

4. The network access device of claim 1 wherein said network access device is configured to both transmit and receive data to and from other devices, said network access device utilizing PPPoE, PPTP, IPoE, MPLS, or one or more VLANs.

5. The network access device of claim 1 further comprising one or more customer devices and/or gateway devices mounted to towers, buildings, silos, trees, utility poles or light poles.

6. A network access device comprising:
one or more directional antennas oriented to provide up to 360-degree signal coverage, said one or more directional antennas connected to one or more radios;
said one or more radios each operating on a same channel or independent channels dependent upon said one or more radios or said one or more antennas;
said one or more directional antennas and said one or more radios and other network access device components being housed in an environmentally protected enclosure, said enclosure configured to prevent RF energy from entering or exiting except through said one or more directional antennas, said one or more radios each further recessed into metal enclosures within said environmentally protected enclosure to minimize cross talk between said one or more radios; and
wherein said network access device is configured to distribute network access to and from the device location to other nearby geographic locations wirelessly through said one or more radios, said network access device further configured to provide customer termination at said network access device location via wireless or wired connection.

7. The network access device of claim 6 further comprising one or more MIMO configured radios and antennas.

8. The network access device of claim 6 further comprising one or more interfaces configured for fiber optic or copper network connectivity.

9. The network access device of claim 6 wherein said network access device is configured to both transmit and receive data to and from other devices, said network access device utilizing PPPoE, PPTP, IPoE, MPLS, or one or more VLANs.

10. The network access device of claim 6 further comprising one or more customer devices and/or gateway devices mounted to towers, buildings, silos, trees, utility poles or light poles.

11. A network access device comprising:
one or more directional horn antennas oriented to provide up to 360-degrees of signal coverage, said one or more directional horn antennas connected to one or more radios;
said one or more radios each operating on a same channel or independent channels dependent upon said one or more radios or said one or more antennas;
said one or more directional horn antennas and said one or more radios and other network access device components being housed in an environmentally protected enclosure, said enclosure configured to prevent RF energy from entering or exiting except through said one or more directional antennas, said one or more radios each further recessed into metal enclosures within said environmentally protected enclosure to minimize cross talk between said one or more radios; and
wherein said network access device is configured to distribute network access to and from the device location to other nearby geographic locations wirelessly through said one or more radios.

12. The network access device of claim 11 further comprising one or more MIMO configured radios and directional horn antennas.

13. The network access device of claim 11 further comprising one or more interfaces configured for fiber optic or copper network connectivity.

14. The network access device of claim 11 wherein said network access device is configured to both transmit and receive data to and from other devices, said network access device utilizing PPPoE, PPTP, IPoE, MPLS, or one or more VLANs.

15. The network access device of claim 11 further comprising one or more customer devices and/or gateway devices mounted to towers, buildings, silos, trees, utility poles or light poles.

16. A network access device comprising:
one or more directional horn antennas oriented to provide up to 360-degrees of signal coverage, said one or more directional horn antennas connected to one or more radios;
said one or more radios each operating on a same channel or independent channels dependent upon said one or more radios or said one or more antennas;
said one or more directional horn antennas and said one or more radios and other network access device components being housed in an environmentally protected enclosure, said enclosure configured to prevent RF energy from entering or exiting except through said one or more directional antenna, said one or more radios each further recessed into metal enclosures within said environmentally protected enclosure to minimize cross talk between said one or more radios s; and
wherein said network access device is configured to distribute network access to and from the device location to other nearby geographic locations wirelessly through said one or more radios, said network access device further configured to provide customer termination at said network access device location via wireless or wired connection.

17. The network access device of claim 16 further comprising one or more MIMO configured radios and directional horn antennas.

18. The network access device of claim 16 further comprising one or more interfaces configured for fiber optic or copper network connectivity.

19. The network access device of claim 16 wherein said network access device is configured to both transmit and receive data to and from other devices, said network access device utilizing PPPoE, PPTP, IPoE, MPLS, or one or more VLANs.

20. The network access device of claim 16 further comprising one or more customer devices and/or gateway devices mounted to towers, buildings, silos, trees, utility poles or light poles.

21. A network access device comprising:
two or more directional horn antennas oriented to provide up to 360-degrees of signal coverage, said two or more directional horn antennas connected to one or more radios;
two or more of the said directional horn antennas are connected to the same radio and oriented to improve transmit and receive signals;
said one or more radios each operating on a same channel or independent channels dependent upon said one or more radios or said one or more antennas;
said one or more directional horn antennas and said one or more radios and other network access device components being housed in an environmentally protected enclosure, said enclosure configured to prevent RF energy from entering or exiting except through said one or more directional antennas, said one or more radios each further recessed into metal enclosures within said environmentally protected enclosure to minimize cross talk between said one or more radios; and
wherein said network access device is configured to distribute network access to and from the device location to other nearby geographic locations wirelessly through said one or more radios, said network access device further configured to provide customer termination at said network access device location via wireless or wired connection.

22. The network access device of claim 21 further comprising one or more MIMO capable radios and directional horn antennas.

23. The network access device of claim 21 further comprising one or more interfaces capable of fiber optic or copper network connectivity.

24. The network access device of claim 21 wherein said network access device is configured to both transmit and receive data to and from other devices, said network access device utilizing PPPoE, PPTP, IPoE, MPLS, or one or more VLANs.

25. The network access device of claim 21 further comprising one or more customer devices and/or gateway devices mounted to towers, buildings, silos, trees, utility poles or light poles.

26. A network access device comprising:
two or more directional horn antennas oriented to provide up to 360-degrees of signal coverage, said two or more directional horn antennas connected to one or more radios;
two or more of the said directional horn antennas are connected to the same radio and oriented to improve transmit and receive signals;
said one or more radios each operating on a same channel or independent channels dependent upon said one or more radios or said one or more antennas;
said one or more directional horn antennas and said one or more radios and other network access device components being housed in an environmentally protected enclosure, said enclosure configured to prevent RF energy from entering or exiting except through said one or more directional antennas, said one or more radios each further recessed into metal enclosures within said environmentally protected enclosure to minimize cross talk between said one or more radios; and
wherein said network access device is configured to distribute network access to and from the device location to other nearby geographic locations wirelessly through said one or more radios.

27. The network access device of claim 26 further comprising one or more MIMO configured radios and directional horn antennas.

28. The network access device of claim 26 further comprising one or more interfaces configured for fiber optic or copper network connectivity.

29. The network access device of claim 26 wherein said network access device is configured to both transmit and receive data to and from other devices, said network access device utilizing PPPoE, PPTP, IPoE, MPLS, or one or more VLANs.

30. The network access device of claim 26 further comprising one or more customer devices and/or gateway devices mounted to towers, buildings, silos, trees, utility poles or light poles.

31. A wireless network access system comprising:
one or more gateway devices;
one or more customer devices;
said one or more customer devices configured to manually or automatically connect wirelessly to one or more other said customer devices or one or more said gateway devices or a combination of one or more other customer devices and one or more gateway devices;
said one or more customer devices configured to receive beacon data from other said one or more customer devices and said one or more gateway devices configured to provide routing and switching functionality to each device within said network access system;
wherein said one or more gateway devices and said one or more customer devices are located outdoors and configured for providing up to 360 degrees of wireless coverage;
wherein said one or more customer devices and/or said one or more gateway devices connected to said wireless network access system transmit said beacon data and are configured to ping a remote gateway and/or head-end gateway location; and
wherein said one or more customer devices and said one or more gateway devices passively scan all radio and antenna combinations to determine channel usability, interference and collect beacon information per antenna direction and wherein a current uplink is changed responsive to a scan exceeding a pre-established improved performance threshold.

32. The wireless network access system of claim 31 wherein said one or more customer devices utilize a dynamic uplink selection process using a score-based, multiple-criteria decision analysis to determine an optimal uplink from data transmitted by said one or more customer devices and said one or more gateway devices within said network access system.

33. The wireless network access system of claim 31 wherein beacon values are individually weighted and added or subtracted from a maximum starting score based on one or more of the following: signal strength, wireless link capacity, data rates, average and peak throughput utilization, available bandwidth, connected customer counts, hop count, noise floor, radio transmit power, antenna gain, antenna azimuth, interference, packet error rate and operational mode.

34. The wireless network access system of claim 31 wherein said one or more gateway devices and said one or more customer devices are configured for terminating a customer tunnel such as PPPoE, PPTP, IPoE, MPLS, one or more VLAN(s) to a wired or wireless interface connected to said one or more gateway devices or said one or more customer devices.

35. The wireless network access system of claim 31 wherein said one or more gateway devices and/or one or more customer devices are mounted to towers, buildings, silos, trees, utility poles or light poles.

36. The wireless network access system of claim 31 wherein said one or more customer devices considers a score for itself and determines how said score impacts a new uplink.

37. The wireless network access system of claim 31 wherein said one or more customer devices and/or one or more gateway devices analyze beacon information, passive scanning data and global settings and restrictions to determine a best one of said one or more gateway devices or said customer devices with which to wirelessly connect.

38. The wireless network access system of claim 31 further comprising one or more MIMO configured radios and/or antennas.

39. A wireless network access system comprising:
one or more gateway devices;
one or more customer devices;
said one or more customer devices configured to manually or automatically connect wirelessly to one or more other said customer devices or one or more said gateway devices or a combination of one or more other customer devices and one or more gateway devices;
said one or more customer devices configured to receive beacon data from other said one or more customer devices and said one or more gateway devices configured to provide routing and switching functionality to each device within said network access system;
wherein said one or more gateway devices and said one or more customer devices are located outdoors and configured for providing up to 360 degrees of wireless coverage;
wherein said one or more said customer devices and said one or more gateway devices utilize one or more directional horn antennas;
wherein said one or more customer devices and/or said one or more gateway devices connected to said wireless network access system transmit said beacon data and are configured to ping a remote gateway and/or head-end gateway location; and
wherein said one or more customer devices and said one or more gateway devices passively scan all radio and antenna combinations to determine channel usability, interference and collect beacon information per antenna direction and wherein a current uplink is changed responsive to a scan exceeding a pre-established improved performance threshold.

40. The wireless network access system of claim 39 wherein said one or more customer devices utilize a dynamic uplink selection process using a score-based, multiple-criteria decision analysis to determine an optimal uplink from data transmitted by said one or more customer devices and said one or more gateway devices within said network access system.

41. The wireless network access system of claim 39 wherein beacon values are individually weighted and added or subtracted from a maximum starting score based on one or more of the following: signal strength, wireless link capacity, data rates, average and peak throughput utilization, available bandwidth, connected customer counts, hop count, noise floor, radio transmit power, antenna gain, antenna azimuth, interference, packet error rate and operational mode.

42. The wireless network access system of claim 39 wherein said one or more gateway devices and said one or more customer devices are configured for terminating a customer tunnel such as PPPoE, PPTP, IPoE, MPLS, one or more VLAN(s) to a wired or wireless interface connected to said one or more gateway devices or said one or more customer devices.

43. The wireless network access system of claim 39 wherein said one or more gateway devices and/or one or more customer devices are mounted to towers, buildings, silos, trees, utility poles or light poles.

44. The wireless network access system of claim 39 wherein said one or more customer devices considers a score for itself and determines how said score impacts a new uplink.

45. The wireless network access system of claim 39 wherein said one or more customer devices and/or one or more gateway devices analyze beacon information, passive scanning data and global settings and restrictions to determine a best one of said one or more gateway devices or said customer devices with which to wirelessly connect.

46. The wireless network access system of claim 39 further comprising one or more MIMO capable radios and/or antennas.

47. The wireless network access system of claim 39 wherein beacon values are individually weighted and added or subtracted from said maximum starting score based on one or more of the following: signal strength, wireless link capacity, data rates, average and peak throughput utilization, available bandwidth, connected customer counts, hop count, noise floor, radio transmit power, antenna gain, antenna azimuth, interference, packet error rate and operational mode.

48. A wireless network access system comprising:
one or more gateway devices;
one or more customer devices;
said one or more customer devices configured to manually or automatically connect wirelessly to one or more other said customer devices or one or more said gateway devices or a combination of one or more other customer devices and one or more gateway devices;
said one or more customer devices configured to receive beacon data from other said one or more customer devices and said one or more gateway devices configured to provide routing and switching functionality to each device within said network access system;
said one or more gateway devices and said one or more customer devices are located outdoors and configured for providing up to 360 degrees of wireless coverage;
said one or more gateway devices and said one or more customer devices configured to function as both an access point and client simultaneously;
wherein said one or more customer devices and/or said one or more gateway devices connected to said wireless network access system transmit said beacon data and are configured to ping a remote gateway and/or head-end gateway location; and
wherein said one or more customer devices and said one or more gateway devices passively scan all radio and antenna combinations to determine channel usability, interference and collect beacon information per antenna direction and wherein a current uplink is changed responsive to a scan exceeding a pre-established improved performance threshold.

49. The wireless network access system of claim 48 wherein said one or more customer devices utilize a dynamic uplink selection process using a score-based, multiple-criteria decision analysis to determine an optimal uplink from data transmitted by said one or more customer devices and said one or more gateway devices within said network access system.

50. The wireless network access system of claim 48 wherein beacon values are individually weighted and added or subtracted from a maximum starting score based on one or more of the following: signal strength, wireless link capacity, data rates, average and peak throughput utilization, available bandwidth, connected customer counts, hop count, noise floor, radio transmit power, antenna gain, antenna azimuth, interference, packet error rate and operational mode.

51. The wireless network access system of claim 48 wherein said one or more gateway devices and said one or more customer devices are configured for terminating a customer tunnel such as PPPoE, PPTP, IPoE, MPLS, one or more VLAN(s) to a wired or wireless interface connected to said one or more gateway devices or said one or more customer devices.

52. The wireless network access system of claim 48 wherein said one or more gateway devices and/or one or more customer devices are mounted to towers, buildings, silos, trees, utility poles or light poles.

53. The wireless network access system of claim 48 wherein said one or more customer devices considers a score for itself and determines how said score impacts a new uplink.

54. The wireless network access system of claim 48 wherein said one or more customer devices and/or one or more gateway devices analyze beacon information, passive scanning data and global settings and restrictions to determine a best one of said one or more gateway devices or said customer devices with which to wirelessly connect.

55. The wireless network access system of claim 48 further comprising one or more MIMO configured radios and/or antennas.

56. The wireless network access system of claim 48 wherein beacon values are individually weighted and added or subtracted from said maximum starting score based on one or more of the following: signal strength, wireless link capacity, data rates, average and peak throughput utilization, available bandwidth, connected customer counts, hop count, noise floor, radio transmit power, antenna gain, antenna azimuth, interference, packet error rate and operational mode.

* * * * *